(12) United States Patent
Johnson

(10) Patent No.: US 11,993,161 B2
(45) Date of Patent: May 28, 2024

(54) EXTERNAL POWER ASSIST SYSTEMS FOR CHARGING BATTERIES ONBOARD eVTOL AIRCRAFT

(71) Applicant: Textron Innovations Inc., Providence, RI (US)

(72) Inventor: Christopher M. Johnson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 507 days.

(21) Appl. No.: 17/335,603

(22) Filed: Jun. 1, 2021

(65) Prior Publication Data

US 2022/0379747 A1  Dec. 1, 2022

(51) Int. Cl.
| | |
|---|---|
| *B60L 53/122* | (2019.01) |
| *B60L 53/30* | (2019.01) |
| *B64D 27/24* | (2006.01) |
| *B64F 1/00* | (2006.01) |
| *B64F 1/36* | (2017.01) |
| *B64C 27/12* | (2006.01) |

(52) U.S. Cl.
CPC ............ *B60L 53/122* (2019.02); *B60L 53/30* (2019.02); *B64D 27/24* (2013.01); *B64F 1/007* (2013.01); *B64F 1/36* (2013.01); *B60L 2200/10* (2013.01); *B64C 27/12* (2013.01)

(58) Field of Classification Search
CPC .................................................. B60L 53/122
USPC ........................................................ 320/108
See application file for complete search history.

(56) References Cited

U.S. PATENT DOCUMENTS

| | | |
|---|---|---|
| 9,446,858 B2 | 9/2016 | Hess |
| 9,926,084 B2 | 3/2018 | Peverill et al. |
| 10,007,272 B2 | 6/2018 | Tirpak et al. |
| 10,099,782 B2 | 10/2018 | Hundemer |
| 10,913,547 B1 | 2/2021 | Thrun et al. |
| 2017/0021944 A1 | 1/2017 | Peverill et al. |
| 2017/0144754 A1 | 5/2017 | Limvorapun et al. |
| 2017/0158354 A1* | 6/2017 | Bourne ................ B64D 27/24 |
| 2021/0053676 A1* | 2/2021 | Brand ................ B64C 29/0033 |

FOREIGN PATENT DOCUMENTS

| | | |
|---|---|---|
| DE | 3743393 C2 | 10/1990 |
| GB | 2231073 A | 11/1990 |

OTHER PUBLICATIONS

European Search Report; Application No. 21205464.7; European Patent Office; Mar. 22, 2022.
European Exam Report; Application No. 21205464.7; European Patent Office; Apr. 4, 2022.

* cited by examiner

*Primary Examiner* — Yalkew Fantu
(74) *Attorney, Agent, or Firm* — Lawrence Youst PLLC

(57) ABSTRACT

An external power assist system for an eVTOL aircraft having one or more onboard batteries includes a subsurface power source and a power transfer interface electrically coupled to the subsurface power source. The power transfer interface is movable between various positions including a deployed position and a stowed position. The power transfer interface is configured to transfer power to the onboard batteries of the eVTOL aircraft in the deployed position. The power transfer interface is moved at least partially subsurface in the stowed position.

16 Claims, 18 Drawing Sheets

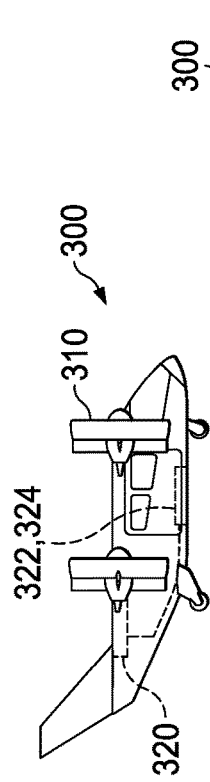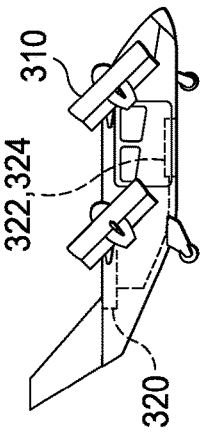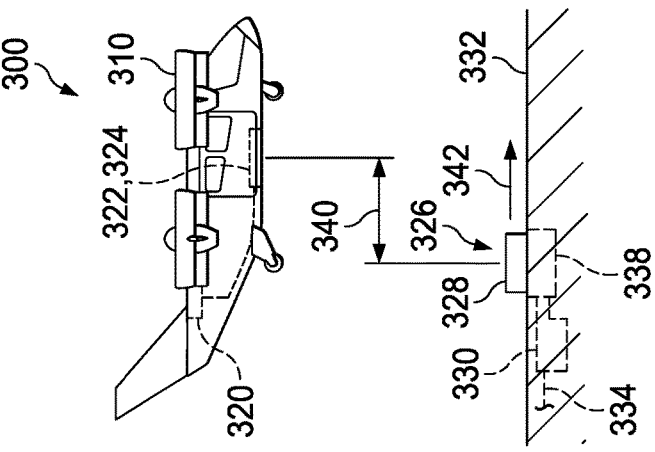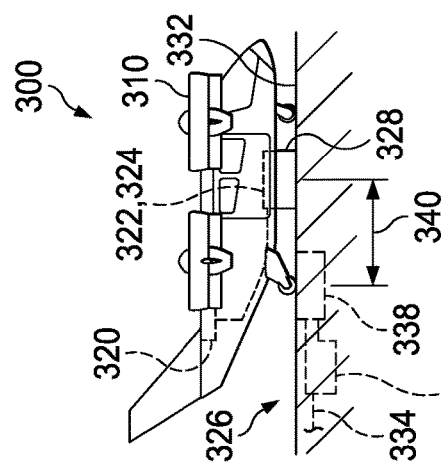

EXTERNAL POWER ASSIST SYSTEMS FOR CHARGING BATTERIES ONBOARD eVTOL AIRCRAFT

TECHNICAL FIELD OF THE DISCLOSURE

The present disclosure relates, in general, to electric power systems operable for use on aircraft and, in particular, to external power assist systems for supplementing the power provided by the onboard batteries of an eVTOL aircraft including charging the onboard batteries when the eVTOL aircraft is grounded and providing power to the eVTOL aircraft at liftoff to conserve the onboard batteries.

BACKGROUND

Fixed-wing aircraft such as airplanes are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another example of VTOL aircraft, attempt to overcome this drawback by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric VTOL (eVTOL) aircraft utilize electricity, either exclusively or in conjunction with liquid fuel, to power the various systems of the aircraft including the propulsion system(s). It has been found, however, that current eVTOL aircraft consume a disproportionate amount of electrical power during takeoff operations as compared to other phases of flight such as forward flight and landing. Attempts have been made to compensate for the disproportionate amount of power used by eVTOL aircraft during takeoff by including oversized battery arrays. These battery arrays, however, increase the overall weight and cost of the aircraft while also reducing flight payload and/or range. Additionally, current charging stations for the onboard batteries of eVTOL aircraft are often large, obtrusive and unable to be stowed, preventing them from being used effectively at a landing surface such as a helipad. Accordingly, a need has arisen for external power assist systems for eVTOL aircraft that can be conveniently located near the aircraft takeoff and landing site, and which provide supplemental power to the eVTOL aircraft while the eVTOL aircraft is grounded and/or taking off.

SUMMARY

In a first aspect, the present disclosure is directed to an external power assist system for an eVTOL aircraft having one or more onboard batteries. The external power assist system includes a subsurface power source and a power transfer interface electrically coupled to the subsurface power source. The power transfer interface is movable between various positions including a deployed position and a stowed position. The power transfer interface is configured to transfer power to the onboard batteries of the eVTOL aircraft in the deployed position. The power transfer interface is moved at least partially subsurface in the stowed position.

In some embodiments, the subsurface power source may include one or more batteries, a generator and/or a power grid connection configured to electrically couple to a power grid. In certain embodiments, the subsurface power source may include a power supply to convert power from the power grid to power usable by the onboard batteries of the eVTOL aircraft. In some embodiments, the power transfer interface may be hingeably rotatable between the deployed and stowed positions about a hinge. In other embodiments, the power transfer interface may be telescopically slidable in a vertical direction between the deployed and stowed positions. In certain embodiments, the power transfer interface may be configured to mechanically couple to the eVTOL aircraft in the deployed position to form a wired power connection. In other embodiments, the power transfer interface may be configured to electrically couple to the eVTOL aircraft in the deployed position to form a wireless power connection. In some embodiments, the power transfer interface may move between the deployed and stowed positions in response to input from an operator. In certain embodiments, the power transfer interface may move from the deployed position to the stowed position in response to the onboard batteries of the eVTOL aircraft reaching a charge threshold. In some embodiments, the power transfer interface may move from the deployed position to the stowed position in response to electrical decoupling between the power transfer interface and the eVTOL aircraft. In certain embodiments, the external power assist system may include a subsurface stow cavity configured to receive the power transfer interface in the stowed position.

In a second aspect, the present disclosure is directed to an aircraft system including an eVTOL aircraft including one or more onboard batteries and an external power assist system configured to selectively provide power to the onboard batteries of the eVTOL aircraft. The external power assist system includes a subsurface power source and a power transfer interface electrically coupled to the subsurface power source. The power transfer interface is movable between various positions including a deployed position and a stowed position. The power transfer interface is configured to transfer power to the onboard batteries of the eVTOL aircraft in the deployed position. The power transfer interface is moved at least partially subsurface in the stowed position.

In some embodiments, the eVTOL aircraft may have a vertical takeoff and landing flight mode including a takeoff phase and the power transfer interface may be configured to transfer power to the eVTOL aircraft during the takeoff phase, thereby conserving power of the onboard batteries. In certain embodiments, the eVTOL aircraft may include a power transfer port configured to couple to the power transfer interface in the deployed position. In some embodiments, the eVTOL aircraft may include a fuselage and the power transfer port may be disposed on an underside of the fuselage. In certain embodiments, the eVTOL aircraft may have a vertical takeoff and landing flight mode including a landing phase and the power transfer interface may be movable along a landing surface in the deployed position to align with the power transfer port of the eVTOL aircraft in the landing phase of the eVTOL aircraft. In some embodiments, the power transfer interface may include a wireless power transmitter and the eVTOL aircraft may include a wireless power receiver, the wireless power transmitter of the power transfer interface configured to transfer power to the wireless power receiver of the eVTOL aircraft in the deployed position. In certain embodiments, the external power assist system may be located at a landing surface for the eVTOL aircraft and the power transfer interface may be movable along the landing surface in the deployed position.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 8A-8H are schematic illustrations of an aircraft system including an eVTOL tiltrotor aircraft and a wireless external power assist system in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
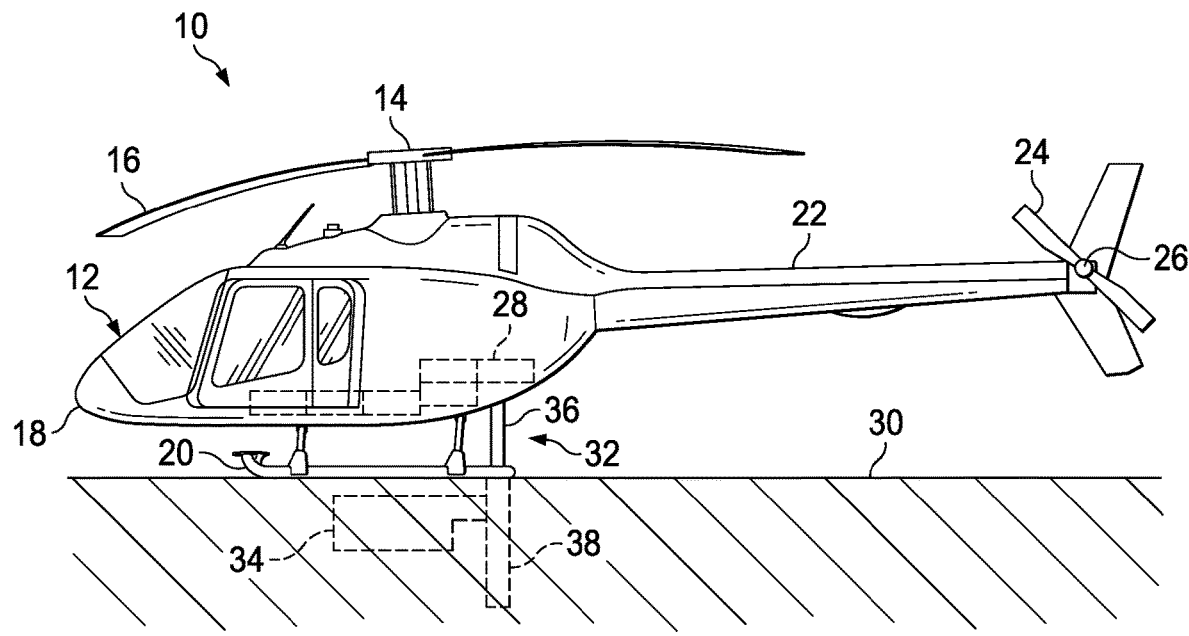
FIGS. 1A-1C are schematic illustrations of an aircraft system including an eVTOL aircraft and an external power assist system in accordance with embodiments of the present disclosure.
Figure 1B:
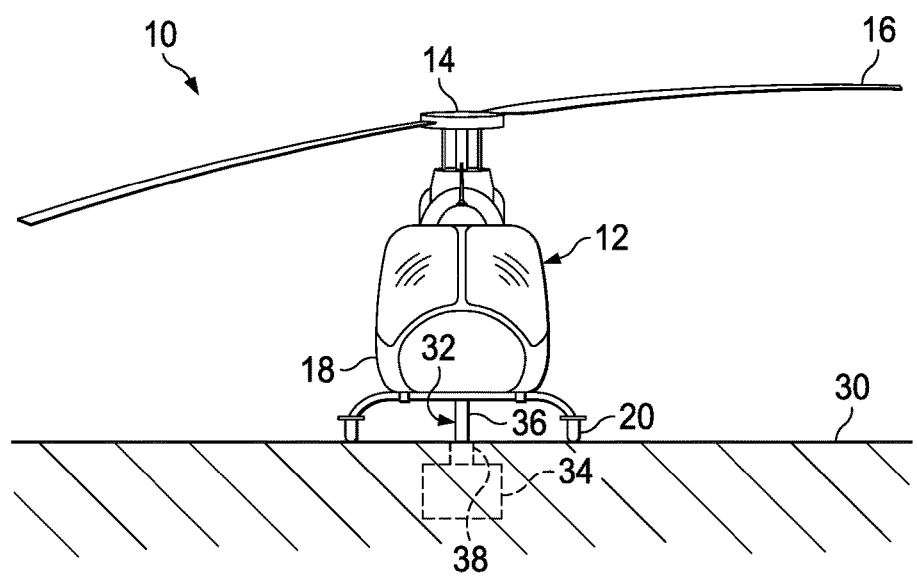
Figure 1C:
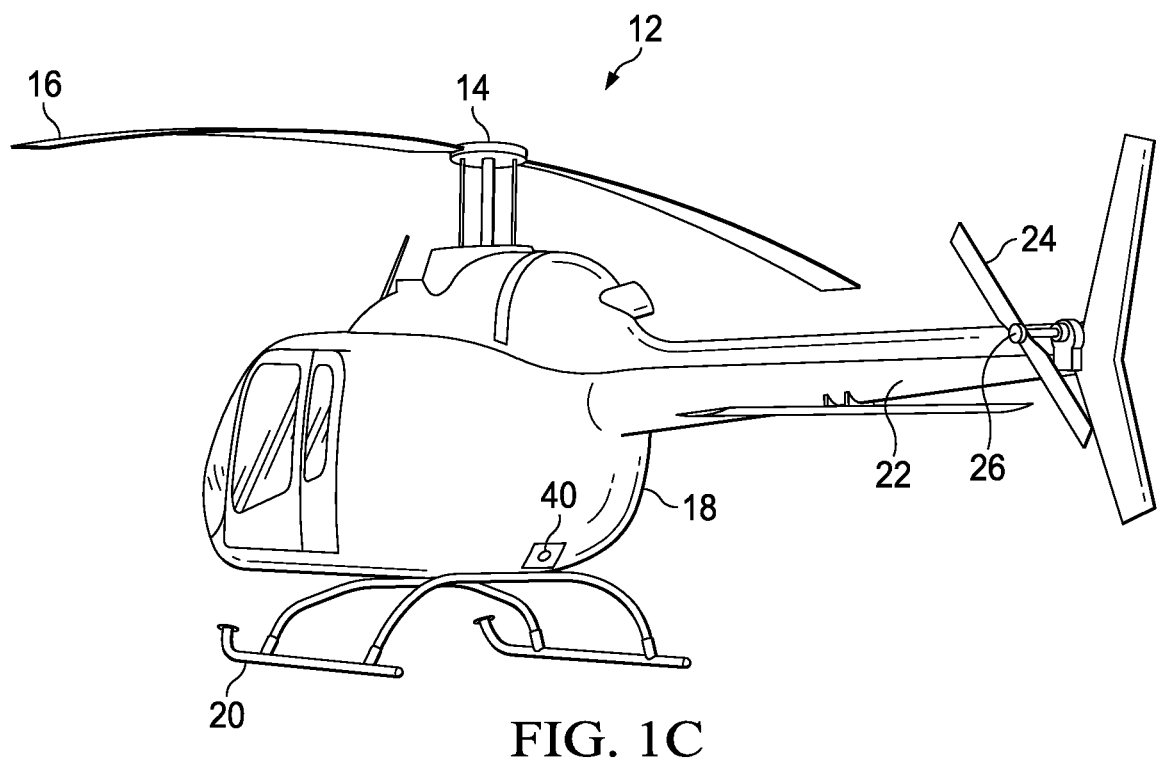

Referring to FIGS. 1A-1C in the drawings, an aircraft system is schematically illustrated and generally designated 10. Aircraft system 10 includes an eVTOL aircraft 12 depicted as a helicopter having a rotor hub assembly 14, which includes a plurality of rotor blade assemblies 16. Rotor hub assembly 14 is rotatable relative to a fuselage 18 of aircraft 12. The pitch of rotor blade assemblies 16 can be collectively and/or cyclically manipulated to selectively control direction, thrust and lift of aircraft 12. A landing gear system 20 including skids provides ground support for aircraft 12. A tailboom 22 extends from fuselage 18. A tail rotor 24 includes a tail rotor hub assembly 26 that is rotatably coupled to the aft portion of tailboom 22.

The various systems of aircraft 12 including rotor hub assembly 14 and tail rotor 24 are powered by one or more onboard batteries 28. Because onboard batteries 28 provide power to the various systems of aircraft 12, it is desired that onboard batteries 28 be fully charged prior to aircraft 12 taking off to ensure maximum flight range and performance. One of the most energy intensive phases of flight of aircraft 12 is the takeoff phase including the liftoff phase in which rotor hub assembly 14 gains rotational speed to provide the lift necessary for aircraft 12 to lift off from landing surface 30. It is also preferable that charging and power assistance for onboard batteries 28 be provided in an unobtrusive manner in a convenient location at or near landing surface 30. Non-limiting examples of landing surface 30 include the earth as well as landing platforms such as a helipad or offshore platform. To address these and other energy needs of aircraft 12, aircraft system 10 includes an external power assist system 32 to selectively provide power to onboard batteries 28 of aircraft 12. External power assist system 32 charges onboard batteries 28 while aircraft 12 is grounded on landing surface 30. For example, external power assist system 32 may serve as the initial or final power-up for transferring power to onboard batteries 28 before aircraft 12 takes flight so that onboard batteries 28 are kept fully charged until aircraft 12 experiences lift. External power assist system 32 also provides power for aircraft 12 to increase the rotational speed of rotor hub assembly 14 to lift off from landing surface 30, thereby providing power assistance during the takeoff phase of aircraft 12. Because the takeoff phase is one of the most energy intensive phases of flight for aircraft 12, the provision of power to aircraft 12 during the takeoff phase significantly conserves the power of onboard batteries 28, thereby increasing the range and performance of aircraft 12. Aircraft 12 may use electrical energy from external power assist system 32 to fulfill 100 percent, 50 percent, 10 percent or any other proportion of the power needs of aircraft 12 during the takeoff phase, with the remainder, if any, being fulfilled by onboard batteries 28.

Figure 2A:
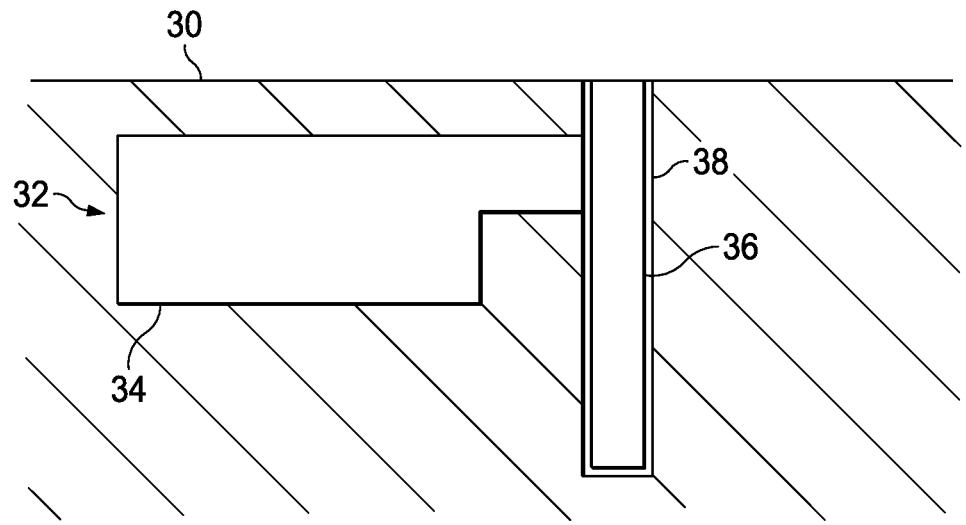
FIGS. 2A-2B are side views of an external power assist system in different telescoping positions in accordance with embodiments of the present disclosure.
Figure 2B:
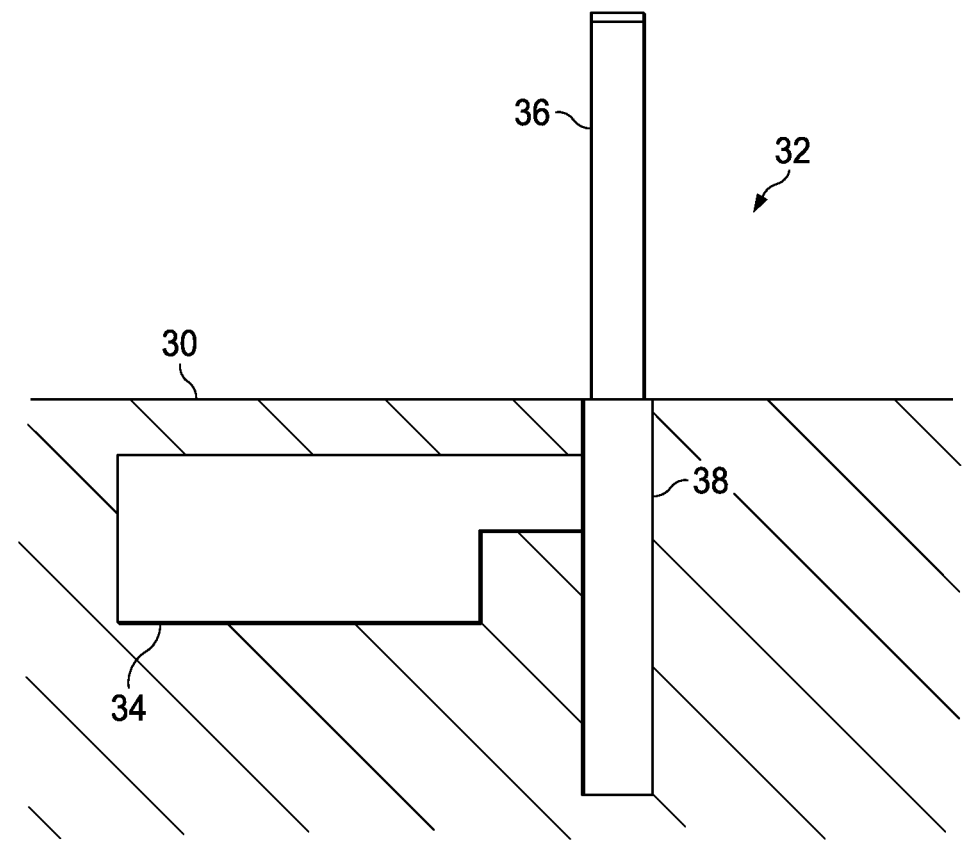

Referring additionally to FIGS. 2A-2B in the drawings, external power assist system 32 includes a subsurface power source 34. In cases in which landing surface 30 is the earth and not a landing platform, subsurface power source 34 is underground or subterranean. Subsurface power source 34 may be any power source capable of generating electrical energy usable by aircraft 12. For example, subsurface power source 34 may be a generator that converts fossil fuel into electrical energy. In another non-limiting example, subsurface power source 34 may include one or more batteries. In some embodiments, such batteries may be a different battery type than onboard batteries 28. In yet another non-limiting example, subsurface power source 34 may include a power grid connection that electrically couples to a power grid, allowing external power assist system 32 to draw upon a virtually limitless source of power. In such examples, subsurface power source 34 may also include a power supply to convert power from the power grid to power that is usable by onboard batteries 28 of aircraft 12.

Electrically coupled to subsurface power source 34 is a power transfer interface 36. Power transfer interface 36 is telescopically slidable in a vertical direction between a stowed position shown in FIG. 2A and a deployed position shown in FIGS. 1A, 1B and 2B. External power assist system 32 includes a subsurface stow cavity 38 that receives power transfer interface 36 so that power transfer interface 36 is disposed or retracted partially or fully below landing surface 30 in the stowed position. In the deployed position, power transfer interface 36 transfers power to onboard batteries 28 of aircraft 12. Power transfer interface 36 mechanically couples to aircraft 12 in the deployed position to form a wired power connection. More particularly, aircraft 12 includes a power transfer port 40 on the underside of fuselage 18 that couples to power transfer interface 36 in the deployed position. Power transfer interface 36 and power transfer port 40 may use any universal mechanical or electrical attachment standard for maximum compatibility between external power assist system 32 and a wide variety of eVTOL aircraft from numerous manufacturers. In some embodiments, power transfer port 40 may include a door or cover that opens to expose the receptacle with which power transfer interface 36 connects.

Power transfer interface 36 may move between the stowed and deployed positions in response to various conditions, parameters or inputs. For example, power transfer interface 36 may automatically move into the deployed position and attach to aircraft 12 upon landing to allow aircraft 12 to use power from external power assist system 32 for charging of onboard batteries 28 and takeoff assistance. In some embodiments, power transfer interface 36 moves from the deployed position to the stowed position in response to onboard batteries 28 reaching a charge threshold such as 80 percent, 90 percent or fully charged. In other embodiments, power transfer interface 36 moves from the deployed position to the stowed position in response to electrical or mechanical decoupling between power transfer interface 36 and aircraft 12. In one non-limiting example, power transfer interface 36 retracts into the stowed position once onboard batteries 28 are at full power and aircraft 12 is relying fully on onboard batteries 28 for operation such as after liftoff. In yet other embodiments, power transfer interface 36 may move between the deployed and stowed positions in response to input from an operator such as the pilot of aircraft 12 or ground personnel. Indeed, it may be desired for a number of reasons to move power transfer interface 36 into the stowed position so that external power assist system 32 does not become an obstacle or obstruction on landing surface 30. By charging onboard batteries 28 and providing takeoff assistance to aircraft 12, external power assist system 32 increases and conserves the power provided by onboard batteries 28 during flight, thereby increasing aircraft range and performance. In addition, external power assist system 32 remains on the ground after aircraft 12 has lifted off so that the weight of external power assist system 32 is not carried by aircraft 12 during flight.

It should be appreciated that aircraft 12 is merely illustrative of a variety of aircraft that can implement the embodiments disclosed herein. Indeed, external power assist system 32 may be implemented on any aircraft that uses electric power. Other aircraft implementations can include quadcopters, hybrid aircraft, non-hovering winged aircraft, tiltwing aircraft, tiltrotor aircraft, quad tiltrotor aircraft, unmanned aircraft, gyrocopters, compound helicopters, drones and the like. As such, those skilled in the art will recognize that external power assist system 32 can be integrated into a variety of aircraft configurations. For example, external power assist system 32 may also be implemented on electrically powered aircraft that take off horizontally from a runway. It should be appreciated that even though aircraft are particularly well-suited to implement the embodiments of the present disclosure, non-aircraft vehicles and devices can also implement the embodiments.

Figure 3A:
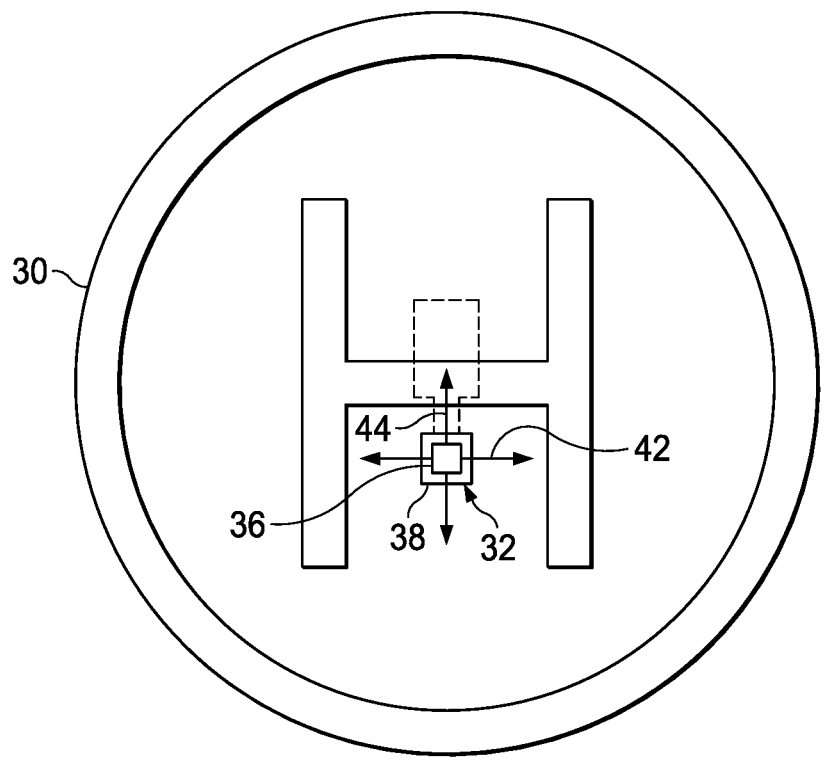
FIGS. 3A-3B are top views of a landing surface with an external power assist system, the external power assist system including a power transfer interface shown in different positions along the landing surface in accordance with embodiments of the present disclosure.
Figure 3B:
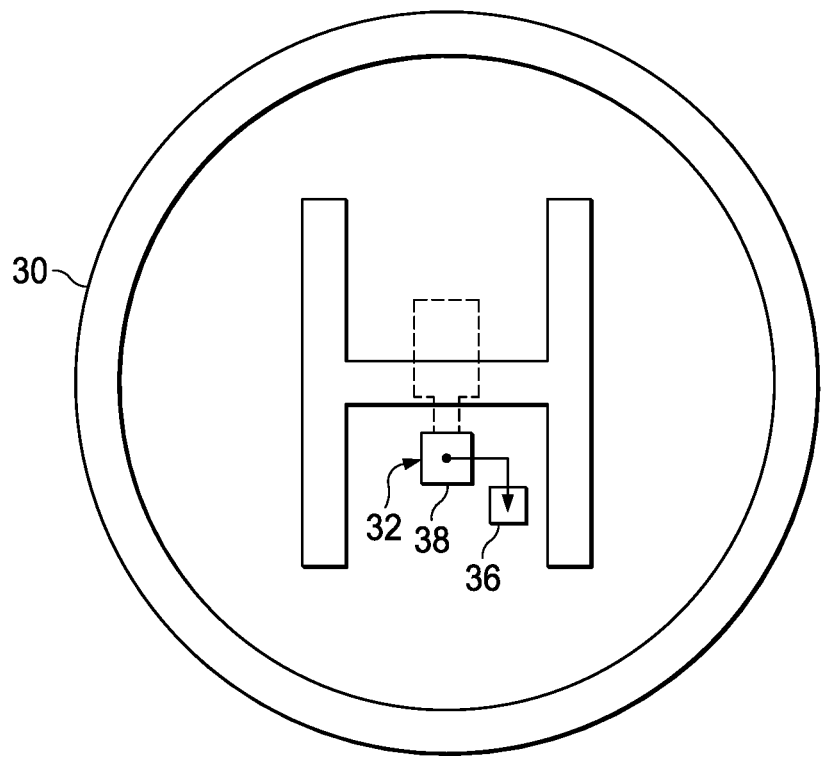

Referring additionally to FIGS. 3A-3B in the drawings, top views of landing surface 30 are shown to illustrate the interface alignment system of external power assist system 32. In FIGS. 3A-3B power transfer interface 36 is shown in the deployed position such that power transfer interface 36 is above landing surface 30. During or after the landing phase of aircraft 12, the interface alignment system of external power assist system 32 enables power transfer interface 36 to move along landing surface 30 while in the deployed position to align with power transfer port 40 of aircraft 12 so that a physical connection can be made therebetween. Power transfer interface 36 is movable in a two-axis system including first and second axes 42, 44, which are orthogonal to one another. Thus, power transfer interface 36 is movable generally along the plane formed by landing surface 30. The interface alignment system may employ a gantry system or other actuating device to move power transfer interface 36 along axes 42, 44. As shown in the non-limiting example of FIG. 3B, power transfer interface 36 has moved along both axes 42, 44 into a new position away from subsurface stow cavity 38 to align with the landing position of aircraft 12 and with power transfer port 40 in particular. Power transfer interface 36 may move along landing surface 30 both while aircraft 12 is landing and after aircraft 12 has landed to facilitate a connection with power transfer port 40.

Figure 4C:
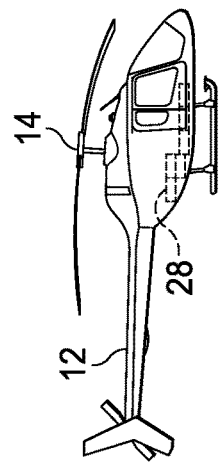
FIGS. 4A-4F are schematic illustrations of an aircraft system including an eVTOL aircraft and an external power assist system in a sequential flight operating scenario in accordance with embodiments of the present disclosure.
Figure 4C:
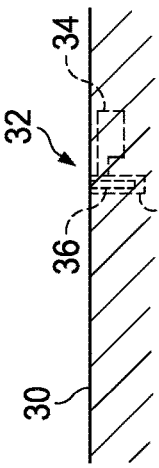
Figure 4B:
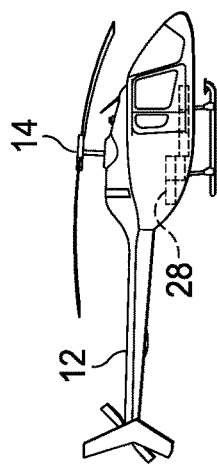
Figure 4B:
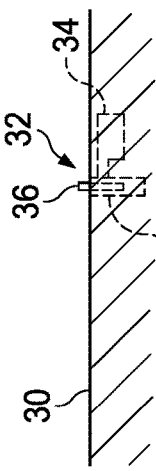
Figure 4A:
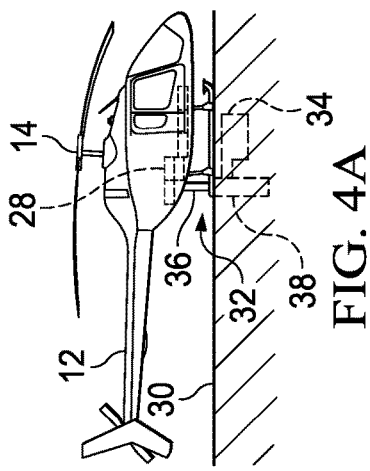

Referring additionally to FIGS. 4A-4F in the drawings, a sequential flight operating scenario of aircraft 12 using external power assist system 32 is depicted. As best seen in FIG. 4A, aircraft 12 is positioned on the ground prior to takeoff. When aircraft 12 is ready for a mission, a flight control system on aircraft 12 commences operations to provide flight control to aircraft 12 which may be onboard pilot flight control, remote flight control, autonomous flight control or a combination thereof. For example, it may be desirable to utilize onboard pilot flight control during certain maneuvers such as takeoff and landing but rely on autonomous flight control during hover and/or forward flight.

In some embodiments, power transfer interface 36 transmits electrical power from subsurface power source 34 to aircraft 12 while aircraft 12 is on the ground to charge onboard batteries 28 prior to takeoff. Power transfer interface 36 is in the deployed position and the distal end of power transfer interface 36 is plugged into power transfer port 40. External power assist system 32 transfers power to onboard batteries 28 in the takeoff phase until aircraft 12 lifts off from landing surface 30, thereby conserving onboard batteries 28 during one of the most energy intensive phases of flight.

During the takeoff phase, the flight control computer of aircraft 12 may allocate power input from onboard batteries 28 and external power assist system 32 in numerous ways depending on the embodiment. For example, the flight control computer may execute a power sharing regime in which onboard batteries 28 and external power assist system 32 share the load at peak demand. In this embodiment, external power assist system 32 may provide power for aircraft 12 when the power consumed by aircraft 12 exceeds a power consumption threshold. In the power sharing regime, both onboard batteries 28 and external power assist system 32 may jointly power each and all of the systems of aircraft 12. Alternatively, some systems of aircraft 12 may be powered exclusively by onboard batteries 28 while other systems of aircraft 12 are powered exclusively by external power assist system 32. For example, rotor hub assembly 14 may be powered by external power assist system 32 while the other systems of aircraft 12 such as the flight control system may be powered by onboard batteries 28. In yet other embodiments, while aircraft 12 is in the takeoff phase, external power assist system 32 may provide all (100 percent) of the power consumed by aircraft 12. Indeed, external power assist system 32 may provide any proportion of the power consumption of aircraft 12 while power transfer interface 36 connects external power assist system 32 to aircraft 12.

External power assist system 32 helps to level, reduce or even eliminate the power draw on onboard batteries 28 while aircraft 12 operates in the takeoff phase. Several benefits accrue to aircraft 12 as a result of this reduced power draw on onboard batteries 28. For example, aircraft 12 may utilize a smaller battery, resulting in aircraft 12 being lighter and less expensive. The energy of onboard batteries 28 is also extended, which extends the flight range of aircraft 12 and enables better prediction of flight endurance, or time aloft. The payload onboard aircraft 12 may be increased due to the reduced size and weight of onboard batteries 28. With this approach, thermal waste within onboard batteries 28 (at high power draw) may be avoided.

Figure 4D:
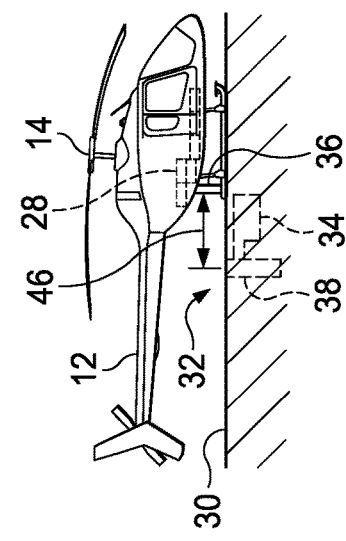
Figure 4E:
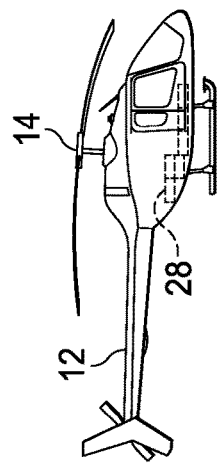
Figure 4F:
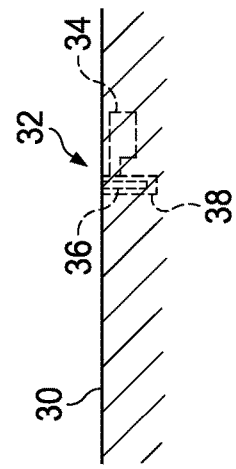

In FIG. 4B, aircraft 12 has lifted off from landing surface 30. In the illustrated example, power transfer interface 36 is in the process of moving from the deployed position to the stowed position in response to the electrical and/or mechanical decoupling between power transfer interface 36 and aircraft 12. It will be appreciated, however, that other events may trigger the transition of power transfer interface 36 from the deployed position to the stowed position such as manual input from the pilot or ground personnel. In FIGS. 4C-4D, aircraft 12 has gained altitude. Power transfer interface 36 has fully retracted into subsurface stow cavity 38 and is therefore in the stowed position, ready to be deployed for the next aircraft. In FIG. 4E, aircraft 12 enters the landing phase as it begins to vertically descend onto landing surface 30. Power transfer interface 36 has been deployed and is fully above landing surface 30. However, power transfer interface 36 is misaligned with the power transfer port of aircraft 12 by a distance 46. To make a physical connection between power transfer interface 36 and the power transfer port of aircraft 12 when aircraft 12 touches down, power transfer interface 36 moves along landing surface 30 in direction 48 to align with the power transfer port of aircraft 12. In FIG. 4F, power transfer interface 36 has moved distance 46, aircraft 12 has landed on landing surface 30 and a connection has been made between power transfer interface 36 and the power transfer port of aircraft 12. Power transfer interface 36 may move as aircraft 12 vertically descends or may move after aircraft 12 has landed. Once the connection has been made between power transfer interface 36 and the power transfer port of aircraft 12, external power assist system 32 may begin charging onboard batteries 28 so that aircraft 12 is ready for its next mission.

Figure 5A:
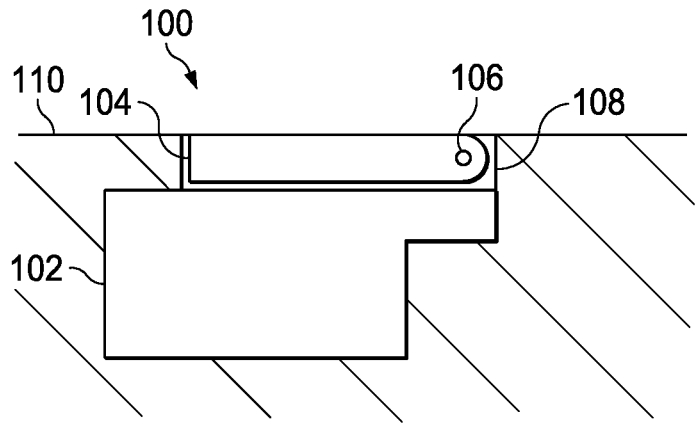
FIGS. 5A-5C are side views of an external power assist system in different hinged positions in accordance with embodiments of the present disclosure.
Figure 5B:
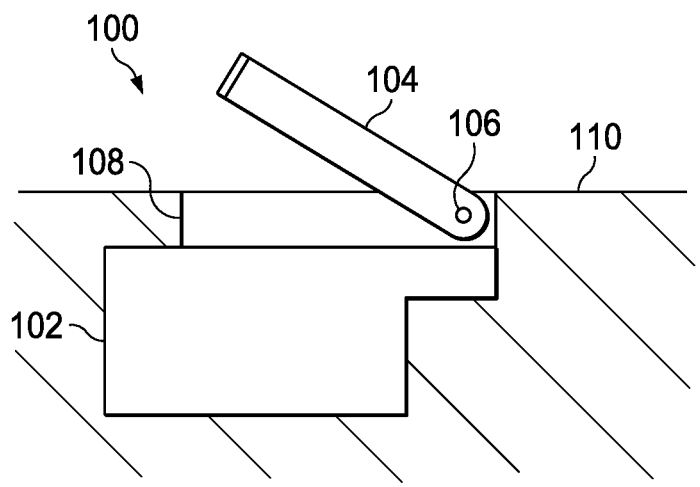
Figure 5C:
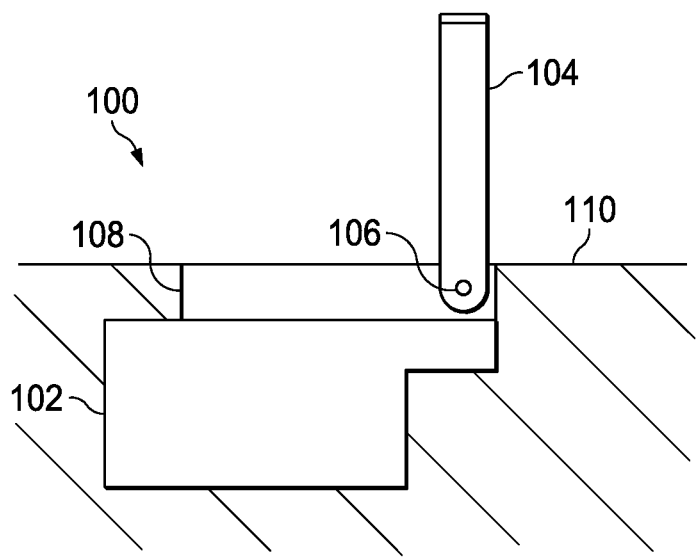

Referring to FIGS. 5A-5C in the drawings, an external power assist system for an eVTOL aircraft is schematically illustrated and generally designated 100. External power assist system 100 includes a subsurface power source 102 to which power transfer interface 104 is electrically coupled. Power transfer interface 104 is hingeably rotatable about hinge 106 between the stowed position shown in FIG. 5A and the deployed position shown in FIG. 5C. FIG. 5B shows power transfer interface 104 in an intermediate position between the stowed and deployed positions. In the stowed position, power transfer interface 104 rotates into subsurface stow cavity 108 such that power transfer interface 104 is below landing surface 110. In other embodiments, however, power transfer interface 104 may lie flat atop landing surface 110 instead of being stowed below landing surface 110, thereby dispensing with the need for subsurface stow cavity 108. In the deployed position, power transfer interface 104 is upright and ready to couple to an eVTOL aircraft to provide power thereto.

Figure 6A:
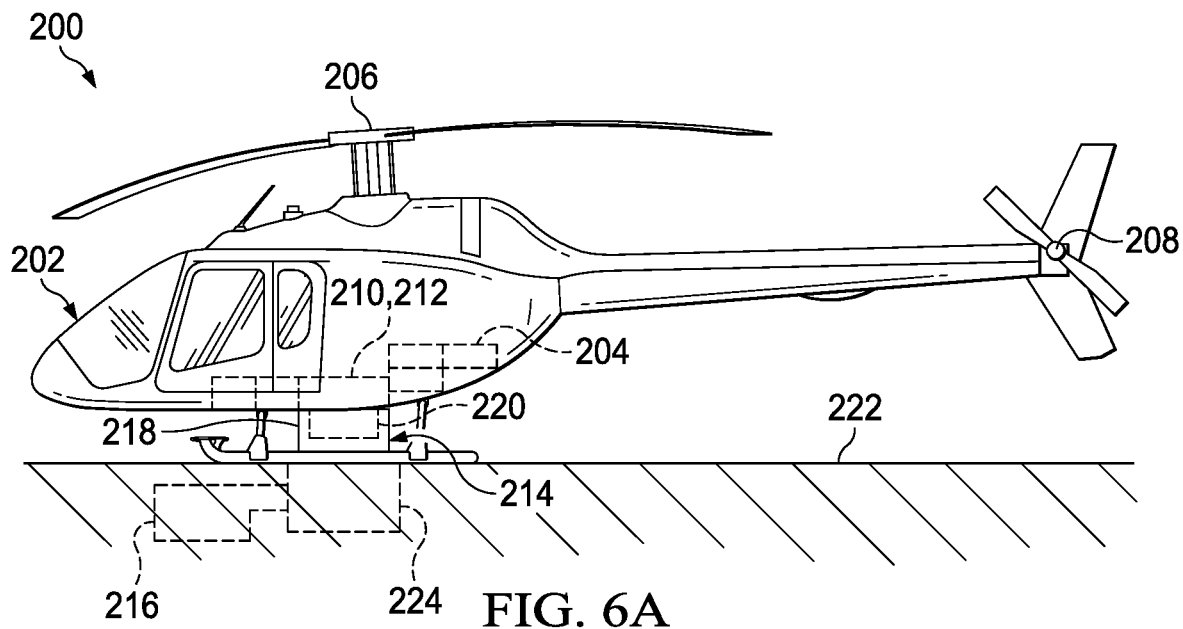
FIGS. 6A-6B are schematic illustrations of an aircraft system including an eVTOL aircraft and a wireless external power assist system in accordance with embodiments of the present disclosure.
Figure 6B:
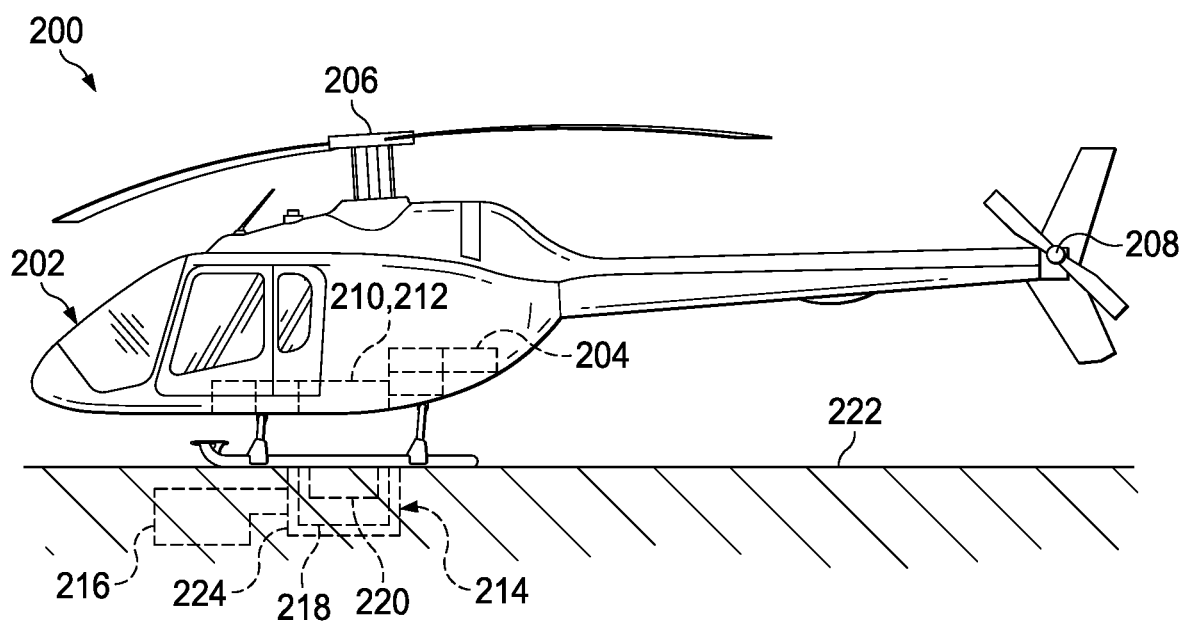

Referring to FIGS. 6A-6B in the drawings, an aircraft system is schematically illustrated and generally designated 200. Aircraft system 200 includes eVTOL aircraft 202 depicted as a helicopter. Aircraft 202 includes onboard batteries 204, which provide power to the various systems of aircraft 202 including rotor hub assembly 206 and tail rotor 208. Aircraft 202 also includes power transfer port 210, which includes a wireless power receiver 212 for receiving power wirelessly and providing such power to onboard batteries 204. Aircraft system 200 also includes wireless external power assist system 214. Wireless external power assist system 214 includes subsurface power source 216, which is electrically coupled to wireless power transfer interface 218. Wireless power transfer interface 218 includes a wireless power transmitter 220 that transmits power wirelessly to a receiving device such as wireless power receiver 212.

Wireless power transfer interface 218 is telescopically slidable in a vertical direction between the deployed position shown in FIG. 6A and the stowed position shown in FIG. 6B. In the stowed position, wireless power transfer interface 218 is disposed partially or fully under landing surface 222. Wireless external power assist system 214 includes subsurface stow cavity 224 to receive wireless power transfer interface 218 in the stowed position. In the deployed position, wireless power transfer interface 218 is raised above landing surface 222 and electrically couples to aircraft 202 to form a wireless power connection. More specifically, wireless power transmitter 220 transfers power to wireless power receiver 212 in the deployed position to charge or otherwise provide power assistance to onboard batteries 204 of aircraft 202. Surface-to-surface proximity and/or contact enables the wireless power connection between wireless power transmitter 220 of wireless external power assist system 214 and wireless power receiver 212 of aircraft 202. Wireless power transfer interface 218 interfaces with the underside of the fuselage of aircraft 202 in the surface-to-surface wireless charging connection, although in some embodiments wireless power transfer interface 218 may interface other portions of aircraft 202. In other embodiments, aircraft 202 may use skin panels equipped with a wireless power receiver to interface with wireless power transmitter 220 of wireless power transfer interface 218. Wireless power transmitter 220 and wireless power receiver 212 may use any universal wireless standard including current or future wireless charging standards to provide universal power assist capabilities to, and maximum compatibility with, a wide variety of eVTOL aircraft. Wireless power transmitter 220 and wireless power receiver 212 may utilize any wireless charging technology such as tightly coupled electromagnetic inductive or non-radiative charging, charging bowls or through-surface type chargers that use loosely coupled or radiative electromagnetic resonant charging and/or uncoupled radio frequency (RF) wireless charging.

Wireless external power assist system 214 includes an interface alignment system that moves wireless power transfer interface 218 along landing surface 222 in the deployed position so that wireless power transmitter 220 may align with wireless power receiver 212. The use of a wireless charging connection allows additional room for error when aligning wireless power transfer interface 218 with power transfer port 210, helping to ensure that a power connection is made. After wireless external power assist system 214 has charged onboard batteries 204 and/or provided liftoff assistance to aircraft 202, wireless power transfer interface 218 may lower back into subsurface stow cavity 224. Wireless external power assist system 214 allows aircraft 202 to utilize external power for charging or liftoff assistance without consuming onboard battery capacity and without requiring that the weight of additional batteries burden the intended mission.

Figure 7A:
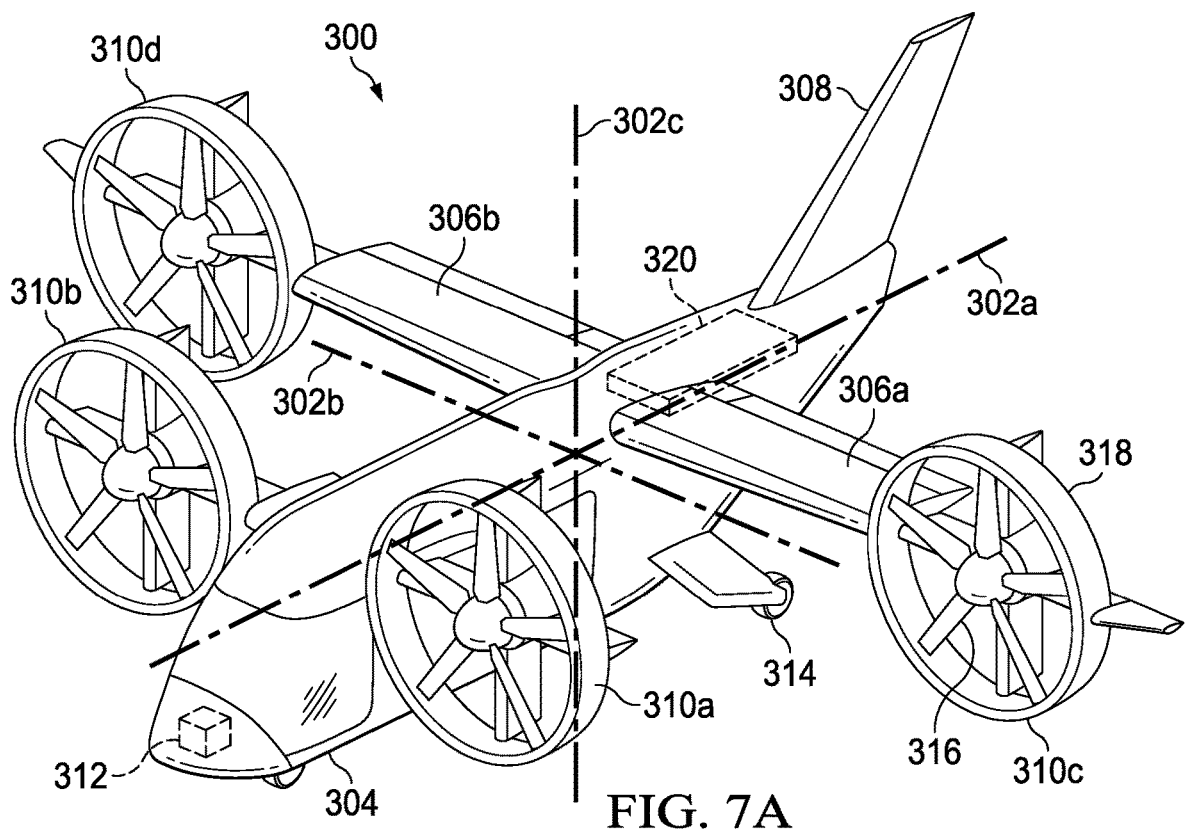
FIGS. 7A-7D are schematic illustrations of an eVTOL tiltrotor aircraft configured for use with an external power assist system in accordance with embodiments of the present disclosure.
Figure 7B:
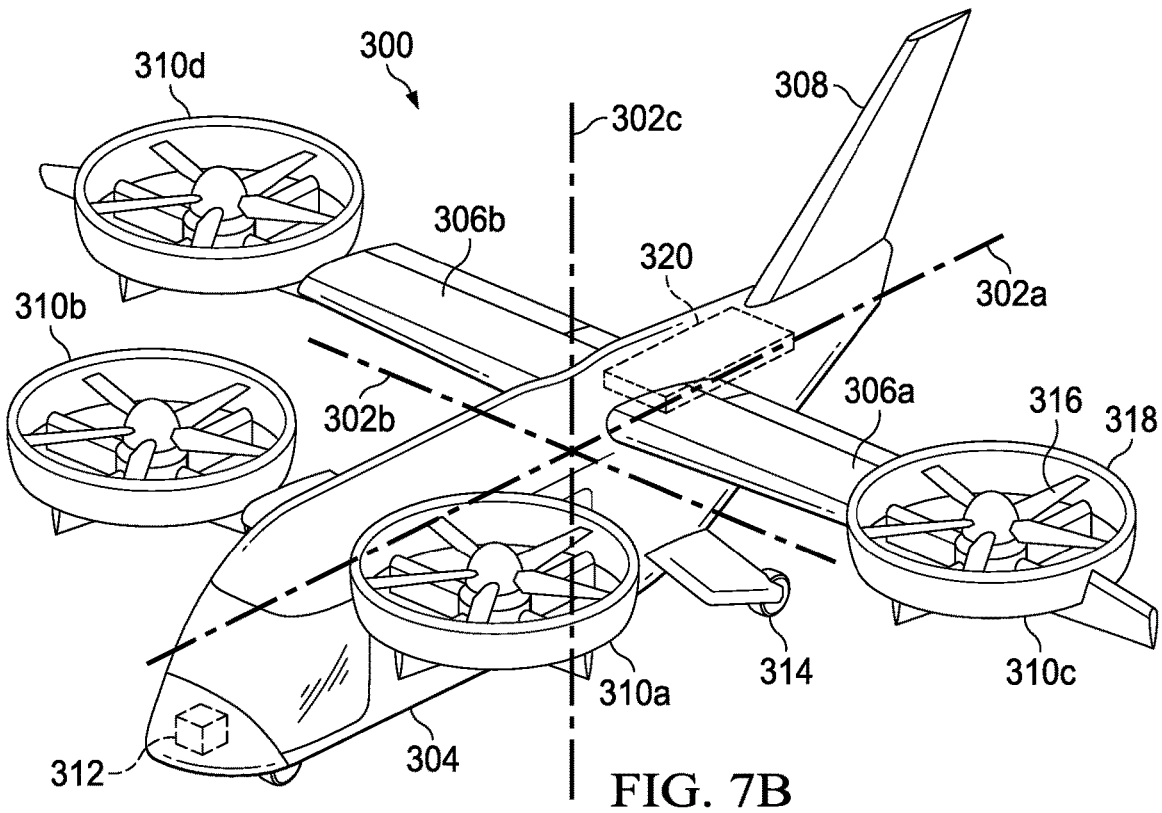
Figure 7C:
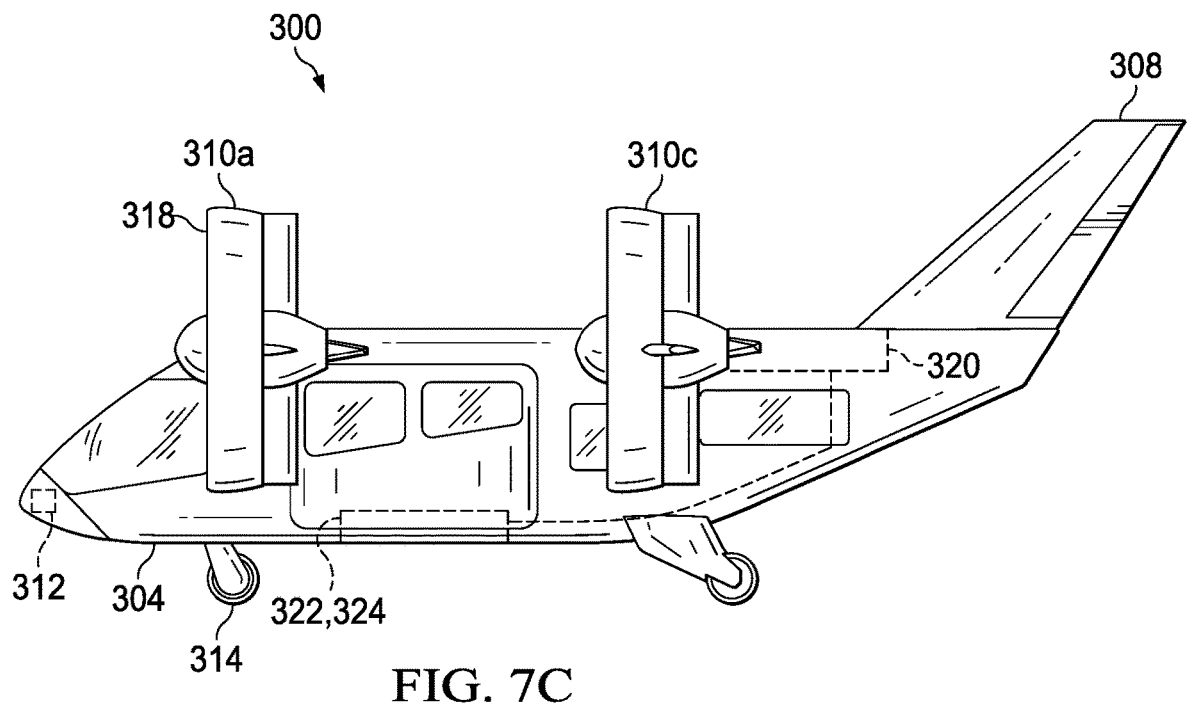
Figure 7D:
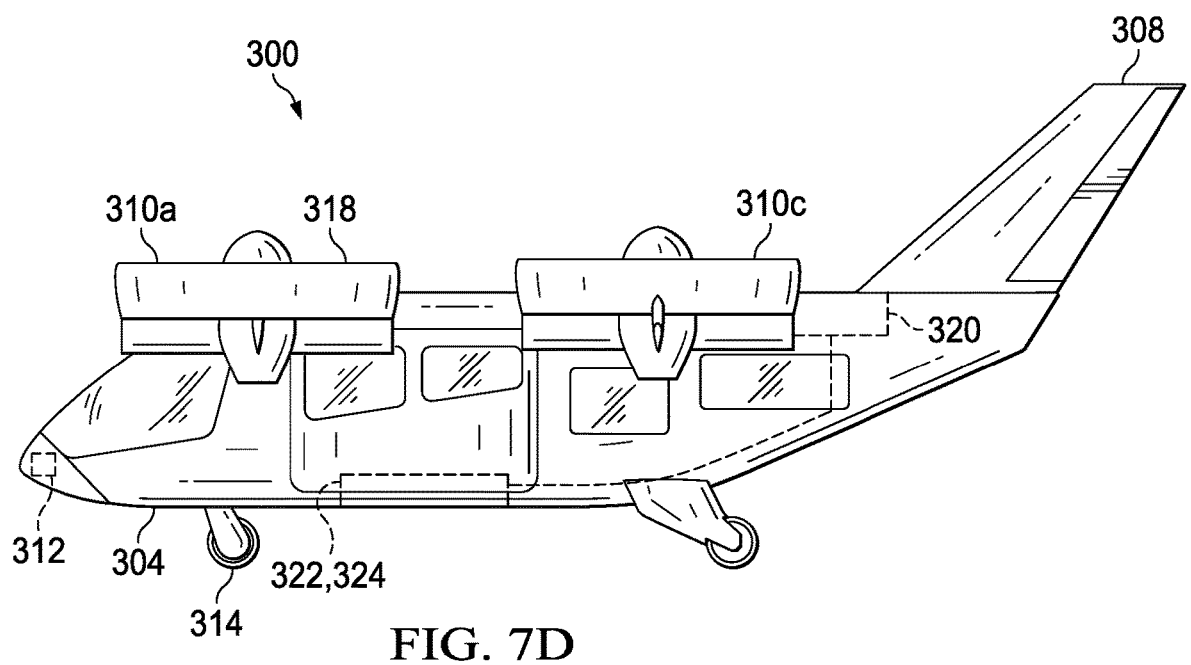

Referring to FIGS. 7A-7D in the drawings, various views of an eVTOL aircraft 300 configured to utilize the external power assist systems of the illustrative embodiments are depicted. Aircraft 300 is depicted as a tiltrotor aircraft. FIGS. 7B and 7D depict aircraft 300 in a vertical takeoff and landing flight mode wherein the ducted propulsion assemblies provide thrust-borne lift. FIGS. 7A and 7C depict aircraft 300 in a forward flight mode wherein the ducted propulsion assemblies provide forward thrust with the forward airspeed of aircraft 300 providing wing-borne lift, thereby enabling aircraft 300 to have a high speed and/or high endurance forward flight mode. Aircraft 300 has a longitudinal axis 302a that may also be referred to as the roll axis, a lateral axis 302b that may also be referred to as the pitch axis and a vertical axis 302c that may also be referred to as the yaw axis. As illustrated, when longitudinal axis 302a and lateral axis 302b are both in a horizontal plane that is normal to the local vertical in the earth's reference frame, aircraft 300 has a level flight attitude.

In the illustrated embodiment, aircraft 300 has an airframe including a fuselage 304, wings 306a, 306b and a tail assembly 308. Wings 306a, 306b have an airfoil cross-section that generates lift responsive to the forward airspeed of aircraft 300. In the illustrated embodiment, wings 306a, 306b are straight wings with a tapered leading edge. It will be appreciated, however, that wings 306a, 306b may be of a wide variety of shapes, sizes and configurations, depending upon the performance characteristics desired. In the illustrated embodiment, wings 306a, 306b include ailerons to aid in roll and/or pitch control of aircraft 300 during forward flight. Tail assembly 308 is depicted as a vertical fin, or stabilizer, that may include one or more rudders to control the yaw of aircraft 300 during forward flight. In other embodiments, tail assembly 308 may have two or more vertical fins and/or a horizontal stabilizer that may include one or more elevators to control the pitch of aircraft 300 during forward flight. It will be appreciated, however, that tail assembly 308 may be of a wide variety of shapes, sizes and configurations, depending upon the performance characteristics desired.

In the illustrated embodiment, aircraft 300 includes four ducted propulsion assemblies, each having a proprotor assembly, forming a distributed thrust array that is coupled to the airframe of aircraft 300. As used herein, the term "distributed thrust array" refers to the use of multiple thrust generating elements, each producing a portion of the total thrust output. The thrust array of aircraft 300 includes a forward-port ducted propulsion assembly 310a, a forward-starboard ducted propulsion assembly 310b, an aft-port ducted propulsion assembly 310c and an aft-starboard ducted propulsion assembly 310d, which may be referred to collectively as ducted propulsion assemblies 310. Forward-port ducted propulsion assembly 310a and forward-starboard ducted propulsion assembly 310b are each rotatably mounted via a spindle to a shoulder portion of fuselage 304 at a forward station thereof. Aft-port ducted propulsion assembly 310c is rotatably mounted via a spindle on the outboard end of wing 306a. Aft-starboard ducted propulsion assembly 310d is rotatably mounted via a spindle on the outboard end of wing 306b. Ducted propulsion assemblies 310 may each include at least one variable speed electric motor and a speed controller configured to provide variable speed control to the proprotor assembly over a wide range of rotor speeds.

When aircraft 300 is operating in the VTOL flight mode and supported by thrust-borne lift, ducted propulsion assemblies 310 each have a generally horizontal position such that the proprotor assemblies are rotating in generally the same horizontal plane, as best seen in FIG. 7D. When aircraft 300 is operating in the forward flight mode and supported by wing-borne lift, ducted propulsion assemblies 310 each have a generally vertical position with the forward proprotor assemblies rotating generally in a forward vertical plane and the aft proprotor assemblies rotating generally in an aft vertical plane, as best seen in FIG. 7C. Transitions between the VTOL flight mode and the forward flight mode of aircraft 300 are achieved by changing the angular positions of ducted propulsion assemblies 310 between their generally horizontal positions and their generally vertical positions as discussed herein.

Aircraft 300 has a fly-by-wire control system that includes a flight control computer 312 that is preferably a redundant digital flight control system including multiple independent flight control computers. Flight control computer 312 preferably includes non-transitory computer readable storage media including a set of computer instructions executable by one or more processors for controlling the operation of aircraft 300. Flight control computer 312 may be implemented on one or more general-purpose computers, special purpose computers or other machines with memory and processing capability. Flight control computer 312 may include one or more memory storage modules including random access memory, non-volatile memory, removable memory or other suitable memory. Flight control computer 312 may be a microprocessor-based system operable to execute program code in the form of machine-executable instructions. Flight control computer 312 may be connected to other computer systems via a suitable communications network that may include both wired and wireless connections.

Flight control computer 312 communicates via a wired communications network within the airframe of aircraft 300 with the electronics nodes of each ducted propulsion assembly 310. Flight control computer 312 receives sensor data from and sends flight command information to ducted propulsion assemblies 310 such that each ducted propulsion assembly 310 may be individually and independently controlled and operated. For example, flight control computer 312 is operable to individually and independently control the proprotor speed and collective blade pitch of each ducted propulsion assembly 310 as well as the angular position of each ducted propulsion assembly 310. Flight control computer 312 may autonomously control some or all aspects of flight operation for aircraft 300. Flight control computer 312 is also operable to communicate with remote systems, such as a ground station via a wireless communications protocol. The remote system may be operable to receive flight data from and provide commands to flight control computer 312 to enable remote flight control over some or all aspects of flight operation for aircraft 300. In addition, aircraft 300 may be pilot operated such that a pilot interacts with a pilot interface that receives flight data from and provides commands to flight control computer 312 to enable onboard pilot control over some or all aspects of flight operation for aircraft 300.

Aircraft 300 includes landing gear 314 for ground operations. Landing gear 314 may include passively operated pneumatic landing struts or actively operated landing struts. In the illustrated embodiment, landing gear 314 includes a plurality of wheels that enable aircraft 300 to taxi and perform other ground maneuvers. Landing gear 314 may include a passive brake system, an active brake system such as an electromechanical braking system and/or a manual brake system to facilitate parking as required during ground operations and/or passenger ingress and egress.

In the illustrated embodiment, ducted propulsion assemblies 310 each have a five bladed proprotor assembly with variable pitch proprotor blades 316 operable for collective pitch control. In other embodiments, the number of proprotor blades could be either greater than or less than five and/or the proprotor blades could have a fixed pitch. Proprotor blades 316 of each ducted propulsion assembly 310 are surrounded by a duct 318, which is supported by stators. The inclusion of duct 318 on each ducted propulsion assembly 310 offers several benefits over open proprotor systems having exposed proprotor blades. For example, ducted propulsion assemblies 310 emit less noise and are therefore preferred when a reduced noise environment is desired, such as during air reconnaissance, clandestine operations or flight in urban airspace. Ducts 318 increase safety for ground personnel and crew by preventing inadvertent collisions with a spinning proprotor. Openly exposed proprotors can lead to blade tip thrust losses during flight. By reducing proprotor blade tip losses, ducted propulsion assemblies 310 are more efficient in producing thrust than open proprotor systems of similar diameter, especially at low speed and high static thrust levels. Also, the thrust vectoring capabilities of open rotor systems are limited as is the use of pressure differentials to augment thrust.

The various systems of aircraft 300 including ducted propulsion assemblies 310 and flight control computer 312 are powered by one or more onboard batteries 320. In some cases, onboard batteries 320 may be augmented by a liquid fuel powered turbo-generator that includes a gas turbine engine and an electric generator. Onboard batteries 320, while illustrated as being in an aft portion of fuselage 304, may be located anywhere and distributed in any manner on aircraft 300. Onboard batteries 320 are configured to interface a wireless external power assist system of the illustrative embodiments via power transfer port 322, which includes wireless power receiver 324. Wireless power receiver 324 wirelessly receives power that is used to charge onboard batteries 320 and/or provide liftoff assistance for aircraft 300.

Figure 8D:
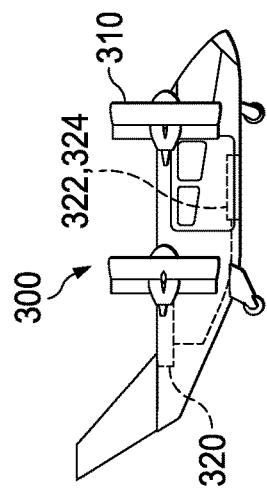
Figure 8C:
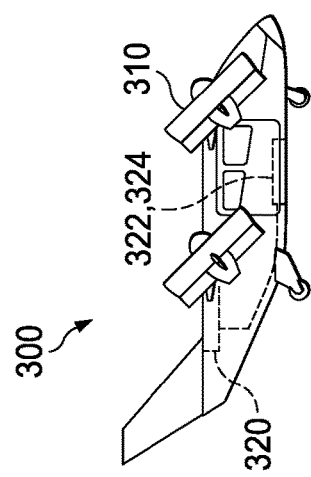
Figure 8B:
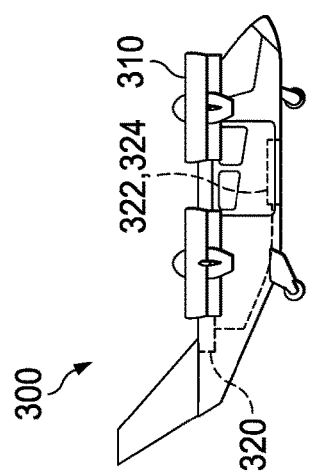
Figure 8A:
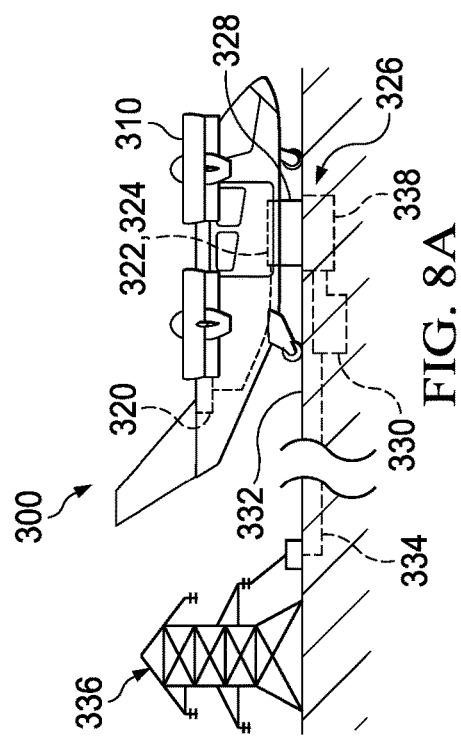

Referring additionally to FIGS. 8A-8H in the drawings, a sequential flight operating scenario of aircraft 300 using wireless external power assist system 326 is depicted. As best seen in FIG. 8A, aircraft 300 is positioned on the ground prior to takeoff. When aircraft 300 is ready for a mission, flight control computer 312 commences operations to provide flight control to aircraft 300 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight.

In some embodiments, wireless power transfer interface 328 wirelessly transmits electrical power from subsurface power source 330 to aircraft 300 while aircraft 300 is on the ground to charge onboard batteries 320 prior to takeoff. Wireless power transfer interface 328 is in the deployed position and the distal end of wireless power transfer interface 328 is proximate or in contact with power transfer port 322. Wireless external power assist system 326 transfers power to onboard batteries 320 in the takeoff phase until aircraft 300 lifts off from landing surface 332, thereby conserving onboard batteries 320 during one of the most energy intensive phases of flight. Subsurface power source 330 includes a power grid connection 334 electrically coupled to a power grid 336. Subsurface power source 330 may also include a power supply to convert power from power grid 336 to power usable by onboard batteries 320.

The takeoff phase of flight is one of the most energy-intensive phases of the mission of aircraft 300. The high level of power consumption during the takeoff phase compromises the amount of energy of onboard batteries 320 that is available for the mission. For example, at peak power consumption thermal waste occurs in onboard batteries 320, which forces a larger battery size in aircraft 300 and disproportionately reduces remaining battery energy. The illustrative embodiments address these issues by utilizing wireless external power assist system 326 from which aircraft 300 wirelessly draws power from wireless power transfer interface 328 during one of the most energy intensive phases of flight (i.e., the takeoff phase).

In the takeoff phase, flight control computer 312 may allocate power input from onboard batteries 320 and wireless external power assist system 326 in numerous ways depending on the embodiment. For example, flight control computer 312 may execute a power sharing regime in which onboard batteries 320 and wireless external power assist system 326 share the load at peak demand. In this embodiment, wireless external power assist system 326 may provide power for aircraft 300 when the power consumed by aircraft 300 exceeds a power consumption threshold. In the power sharing regime, both onboard batteries 320 and wireless external power assist system 326 may jointly power each and all of the systems of aircraft 300. Alternatively, some systems of aircraft 300 may be powered exclusively by onboard batteries 320 while other systems of aircraft 300 are powered exclusively by wireless external power assist system 326. For example, ducted propulsion assemblies 310 may be powered by wireless external power assist system 326 while the other systems of aircraft 300 such as flight control computer 312 may be powered by onboard batteries 320. In yet other embodiments, while aircraft 300 is in the takeoff phase, wireless external power assist system 326 may provide all (100 percent) of the power consumed by aircraft 300. Indeed, wireless external power assist system 326 may provide any proportion of the power consumption of aircraft 300 while wireless power transfer interface 328 wirelessly connects wireless external power assist system 326 to aircraft 300.

Wireless external power assist system 326 helps to level, reduce or even eliminate the power draw on onboard batteries 320 while aircraft 300 operates in the high power flight regime of the takeoff phase. Several benefits accrue to aircraft 300 as a result of this reduced power draw on onboard batteries 320. For example, aircraft 300 may utilize a smaller battery, resulting in aircraft 300 being lighter and less expensive. The energy of onboard batteries 320 is also extended, which extends the flight range of aircraft 300 and enables better prediction of flight endurance, or time aloft. The payload onboard aircraft 300 may be increased due to the reduced size and weight of onboard batteries 320. With this approach, thermal waste within onboard batteries 320 (at high power draw) may be avoided.

In FIG. 8B, aircraft 300 is taking off, starting with a lift to hover and moving to an out of ground effect hover of VTOL flight mode while engaging thrust-borne lift. Upon liftoff, wireless power transfer interface 328 moves from the deployed position shown in FIG. 8A to the stowed position in response to the electrical decoupling between wireless power transfer interface 328 and wireless power receiver 324. In the stowed position, subsurface stow cavity 338 receives wireless power transfer interface 328. It will be appreciated that other events may trigger the transition of wireless power transfer interface 328 from the deployed position to the stowed position such as manual input from the pilot or ground personnel.

As illustrated, the rotor assemblies of each ducted propulsion assembly 310 are rotating in the same horizontal plane forming a two-dimensional distributed thrust array of four rotor systems. As the longitudinal axis and the lateral axis of aircraft 300 are both in the horizontal plane, aircraft 300 has a generally level flight attitude. During the hover phase in FIG. 8B, flight control computer 312 may utilize the individual thrust control capabilities of ducted propulsion assemblies 310 to control flight dynamics to maintain hover stability and to provide pitch, roll and yaw authority for aircraft 300. More specifically, as each ducted propulsion assembly 310 may be independently controllable, operational changes to certain ducted propulsion assemblies 310 enable pitch, roll and yaw control of aircraft 300 during VTOL operations.

After vertical ascent to the desired elevation, aircraft 300 may begin the transition from thrust-borne lift to wing-borne lift. As best seen from the progression of FIGS. 8B-8D, the angular positions of ducted propulsion assemblies 310 are changed by a pitch down rotation to transition aircraft 300 from the VTOL flight mode toward the lower power forward flight mode. As seen in FIG. 8C, ducted propulsion assemblies 310 have been collectively inclined about forty-five degrees pitch down. In the conversion orientations of aircraft 300, a portion of the thrust generated by ducted propulsion assemblies 310 provides lift while a portion of the thrust generated by ducted propulsion assemblies 310 urges aircraft 300 to accelerate in the forward direction such that the forward airspeed of aircraft 300 increases allowing wings 306a, 306b to offload a portion and eventually all of the lift requirement from ducted propulsion assemblies 310.

As best seen in FIGS. 8D-8E, ducted propulsion assemblies 310 have been collectively inclined about ninety degrees pitch down such that the rotor assemblies are rotating in vertical planes providing forward thrust for aircraft 300 with wings 306a, 306b providing lift. Even though the conversion from the VTOL orientation to the forward flight orientation of aircraft 300 has been described as progressing with collective pitch down rotation of ducted propulsion assemblies 310, in other implementations, all ducted propulsion assemblies 310 need not be operated at the same time or at the same rate.

As forward flight with wing-borne lift requires significantly less thrust than VTOL flight with thrust-borne lift, the operating speed of some or all of ducted propulsion assemblies 310 may be reduced, particularly in embodiments having collective blade pitch control. In certain embodiments, some of ducted propulsion assemblies 310 of aircraft 300 could be shut down during forward flight. In the forward flight orientation, the independent rotor speed control provided by flight control computer 312 over each ducted propulsion assembly 310 may provide yaw authority for aircraft 300. In the forward flight orientation, pitch and roll authority is preferably provided by the ailerons and/or elevators on wings 306a, 306b and/or tail assembly 308.

As aircraft 300 approaches its destination, aircraft 300 may begin its transition from wing-borne lift to thrust-borne lift. As best seen from the progression of FIGS. 8E-8G, the angular positions of ducted propulsion assemblies 310 are changed by a pitch up rotation to transition aircraft 300 from the forward flight orientation toward the VTOL orientation. As seen in FIG. 8F, ducted propulsion assemblies 310 have been collectively inclined about forty-five degrees pitch up. In the conversion orientations of aircraft 300, a portion of the thrust generated by ducted propulsion assemblies 310 begins to provide lift for aircraft 300 as the forward airspeed decreases and the lift producing capability of wings 306a, 306b decreases. As best seen in FIG. 8G, ducted propulsion assemblies 310 have been collectively inclined about ninety degrees pitch up such that the rotor assemblies are rotating in the horizontal plane providing thrust-borne lift for aircraft 300. Even though the conversion from the forward flight orientation to the VTOL orientation of aircraft 300 has been described as progressing with collective pitch up rotation of ducted propulsion assemblies 310, in other implementations, all ducted propulsion assemblies 310 need not be operated at the same time or at the same rate.

Once aircraft 300 has completed the transition to the VTOL orientation, aircraft 300 may commence its vertical descent to a surface. In FIG. 8G, aircraft 300 enters the landing phase as it begins to vertically descend onto landing surface 332. Wireless power transfer interface 328 has been deployed and is fully above landing surface 332. However, wireless power transfer interface 328 is misaligned with power transfer port 322 of aircraft 300 by a distance 340. To effectuate a wireless power connection between wireless power transfer interface 328 and power transfer port 322 when aircraft 300 touches down, wireless power transfer interface 328 moves along landing surface 332 in direction 342 to align with power transfer port 322. In FIG. 8H, wireless power transfer interface 328 has moved distance 340, aircraft 300 has landed on landing surface 332 and a wireless power connection has been made between wireless power transfer interface 328 and power transfer port 322. Wireless power transfer interface 328 may move as aircraft 300 vertically descends or may move after aircraft 300 has landed. Once the wireless power connection has been made between wireless power transfer interface 328 and power transfer port 322, wireless external power assist system 326 may begin wirelessly charging onboard batteries 320 so that aircraft 300 is ready for its next mission.

Figure 9:
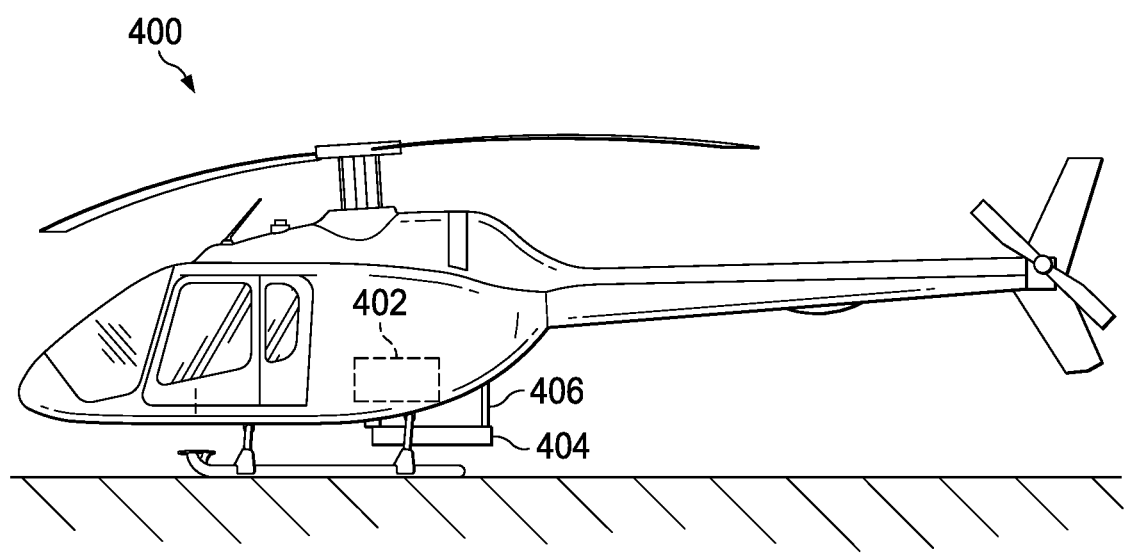
FIG. 9 is a side view of a helicopter utilizing a rigid external battery mount.

Referring to FIG. 9 in the drawings, a helicopter utilizing a previous power assistance system is schematically illustrated and generally designated 400. The various systems of helicopter 400 are powered by internal battery 402. It may sometimes be necessary for helicopter 400 to undergo flight tests to determine the sufficiency of internal battery 402 to power helicopter 400 during flight. Previous helicopters have utilized an external battery 404 rigidly mounted to the fuselage of helicopter 400 by a battery mount 406. The combination of external battery 404 and battery mount 406 requires modifications to the airframe of helicopter 400 as well as additional analysis and schedule planning. External battery 404 is limited in size due to its placement beneath and adjacent to the fuselage of helicopter 400. Because battery mount 406 is not configured to include mechanisms to eject external battery 404, the weight of external battery 404 must be carried with helicopter 400 during its entire mission. These and other issues have led to a need for improved mounting systems by which to attach an external battery to aircraft.

Figure 10:
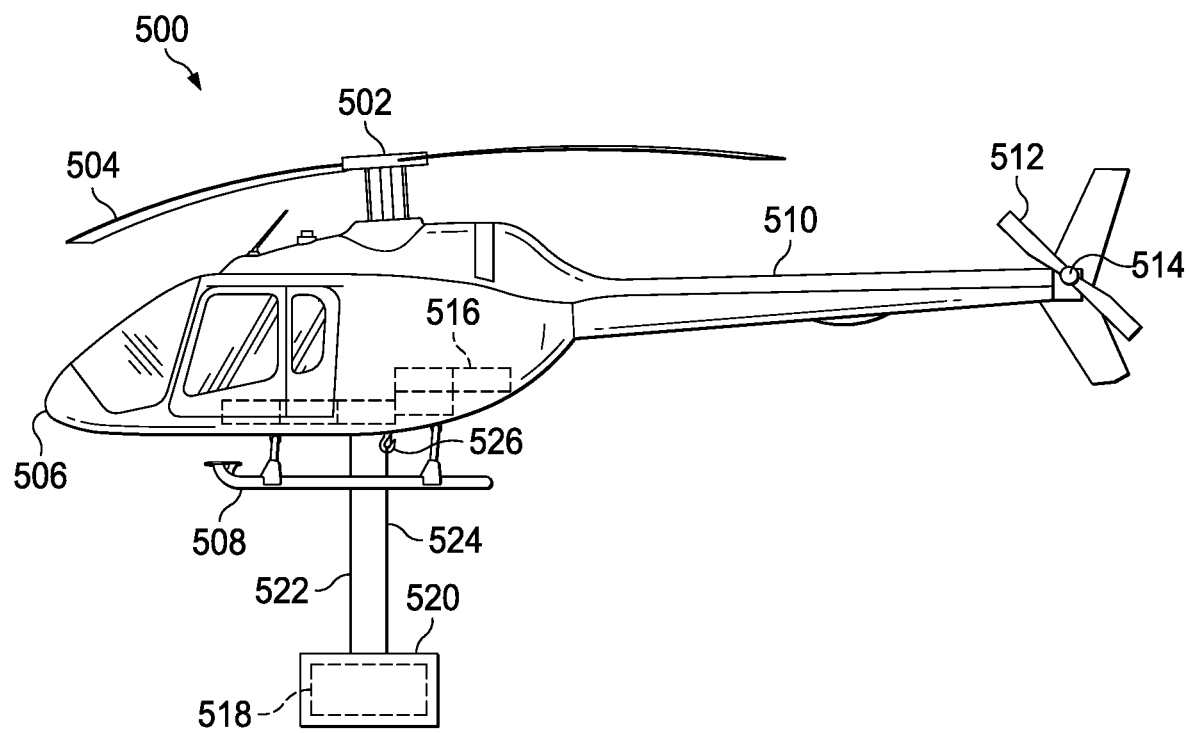
FIG. 10 is a schematic illustration of an eVTOL aircraft utilizing a supplemental battery in accordance with embodiments of the present disclosure.

Referring to FIG. 10 in the drawings, an eVTOL aircraft depicted as a helicopter is schematically illustrated and generally designated 500. Aircraft 500 has a rotor hub assembly 502, which includes a plurality of rotor blade assemblies 504. Rotor hub assembly 502 is rotatable relative to a fuselage 506 of aircraft 500. The pitch of rotor blade assemblies 504 can be collectively and/or cyclically manipulated to selectively control direction, thrust and lift of aircraft 500. A landing gear system 508 including skids provides ground support for aircraft 500. A tailboom 510 extends from fuselage 506. A tail rotor 512 includes a tail rotor hub assembly 514 that is rotatably coupled to the aft portion of tailboom 510.

The various systems of aircraft 500 including rotor hub assembly 502 and tail rotor 512 are powered by one or more internal batteries 516. Aircraft 500 includes a supplemental battery 518 that is external to the airframe of aircraft 500 while also supplementing the power provided by internal batteries 516. Supplemental battery 518 is housed in a battery containment structure 520 to protect supplemental battery 518 therein. It will be appreciated that battery containment structure 520 may contain more than one supplemental battery. Battery containment structure 520 is tethered to the underside of fuselage 506 by two cables. A power cable 522 provides electrical communication between supplemental battery 518 and aircraft 500 so as to allow supplemental battery 518 to supplement the power provided by internal batteries 516. A weight cable 524 acts as a load-bearing cable during flight to provide support and prevent battery containment structure 520 from falling. Weight cable 524 also acts as a failsafe during takeoff. Weight cable 524 may utilize the cargo attachment on existing aircraft such as a cargo hook 526, which is already equipped to support large loads. The size of supplemental battery 518 may depend on the cargo carrying capacity or cargo rating of cargo hook 526 and/or aircraft 500. In addition to flight testing, supplemental battery 518 may be used on production aircraft in both civilian and military applications when supplemental battery power is needed. When used in flight testing, the use of supplemental battery 518 allows an eVTOL flight test program to scale additional battery size needs and add battery capability during the active flight test phase. Because supplemental battery 518 is airborne and flies with aircraft 500, aircraft 500 may travel any necessary distance from the takeoff location while benefiting from the supplemental power provided by supplemental battery 518. Because an existing external hard point for carrying a sling load is utilized, the battery capacity of aircraft 500 is increased without the need for structural modifications to aircraft 500. Supplemental battery 518 can be swapped out between flights or missions easily, and batteries of various sizes and types may be placed in battery containment structure 520 based on need.

Figure 11C:
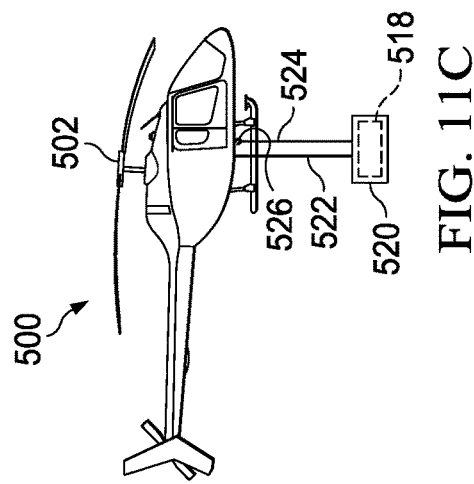
FIGS. 11A-11F are schematic illustrations of an eVTOL aircraft utilizing a supplemental battery in a sequential flight operating scenario in accordance with embodiments of the present disclosure.
Figure 11B:
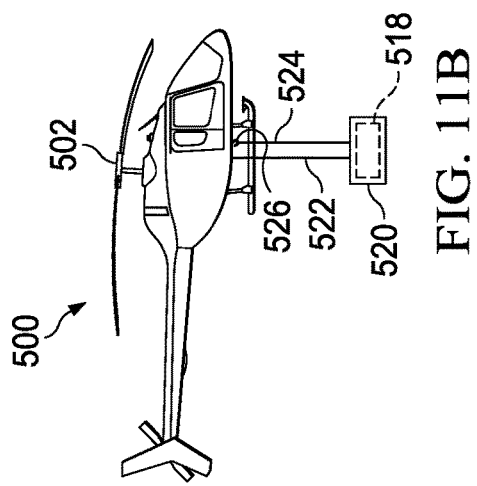
Figure 11A:
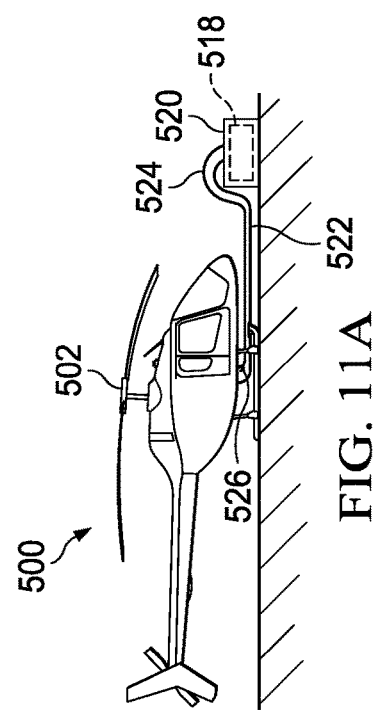
Figure 11D:
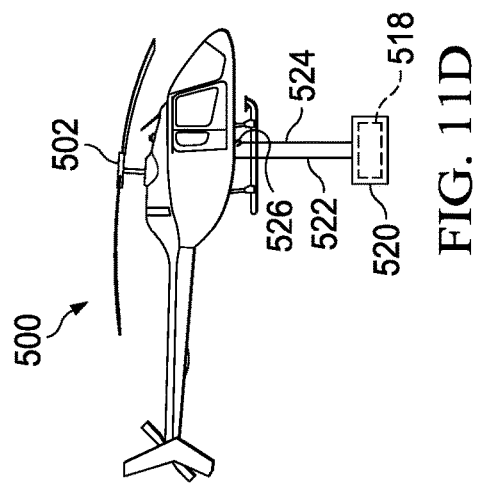

Referring additionally to FIGS. 11A-11F in the drawings, a sequential flight operating scenario of aircraft 500 using supplemental battery 518 is depicted. As best seen in FIG. 11A, aircraft 500 and battery containment structure 520 are positioned on the ground prior to takeoff. When aircraft 500 is ready for a mission, a flight control system on aircraft 500 commences operations to provide flight control to aircraft 500 which may be onboard pilot flight control, remote flight control, autonomous flight control or a combination thereof. For example, it may be desirable to utilize onboard pilot flight control during certain maneuvers such as takeoff and landing but rely on autonomous flight control during hover and/or forward flight.

Figure 11E:
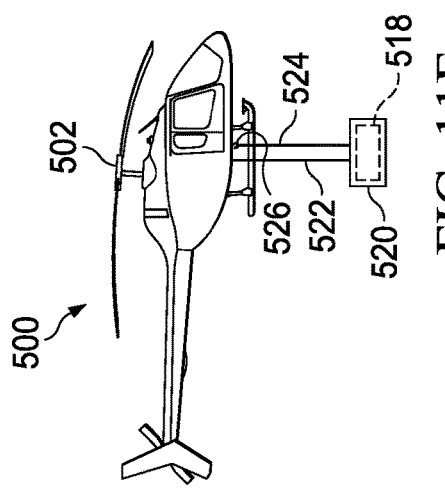
Figure 11F:
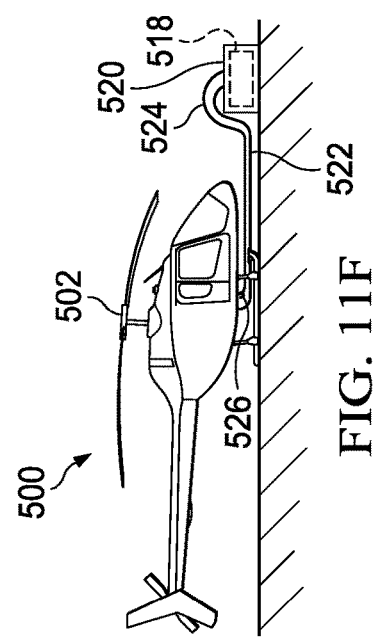

In FIG. 11B, aircraft 500 has lifted off from the ground. Aircraft 500 has gained altitude in FIGS. 11C-11D. Battery containment structure 520 is supported as a sling load by aircraft 500 throughout the flight of aircraft 500 via weight cable 524 and cargo hook 526 while power cable 522 transmits power from supplemental battery 518 to aircraft 500. The flight control computer of aircraft 500 may allocate power input from internal batteries 516 and supplemental battery 518 in numerous ways depending on the embodiment. For example, the flight control computer may execute a power sharing regime in which internal batteries 516 and supplemental battery 518 share the load at peak demand. In this embodiment, supplemental battery 518 may provide power for aircraft 500 when the power consumed by aircraft 500 exceeds a power consumption threshold. In the power sharing regime, both internal batteries 516 and supplemental battery 518 may jointly power each and all of the systems of aircraft 500. Alternatively, some systems of aircraft 500 may be powered exclusively by internal batteries 516 while other systems of aircraft 500 are powered exclusively by supplemental battery 518. For example, rotor hub assembly 502 may be powered by internal batteries 516 while the other systems of aircraft 500 such as the flight control system may be powered by supplemental battery 518, or vice versa. In yet other embodiments, while aircraft 500 is in the takeoff and/or hover phase, supplemental battery 518 may provide all (100 percent) of the power consumed by aircraft 500. Indeed, supplemental battery 518 may provide any proportion of the power consumption of aircraft 500 during the flight of aircraft 500. In FIG. 11E, aircraft 500 enters the landing phase as it begins to vertically descend onto the ground. In FIG. 11F, aircraft 500 along with battery containment structure 520 has landed on the ground. Supplemental battery 518 may then be removed from battery containment structure 520 and replaced with a fully charged battery in preparation for the next mission of aircraft 500. Alternatively, an altogether new battery containment structure containing a new battery may replace battery containment structure 520 for the aircraft's next mission.

Figure 12C:
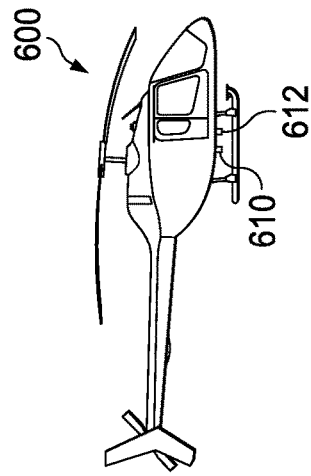
FIGS. 12A-12F are schematic illustrations of an eVTOL aircraft utilizing an ejectable supplemental battery in a sequential flight operating scenario in accordance with embodiments of the present disclosure.
Figure 12B:
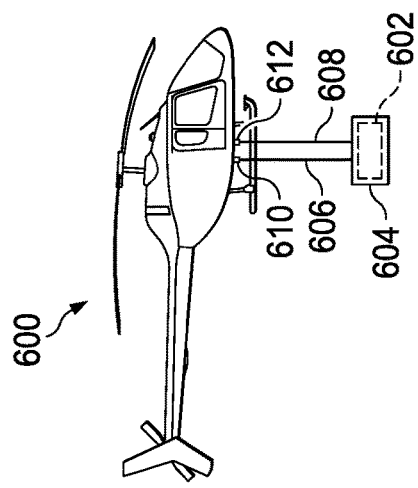
Figure 12A:
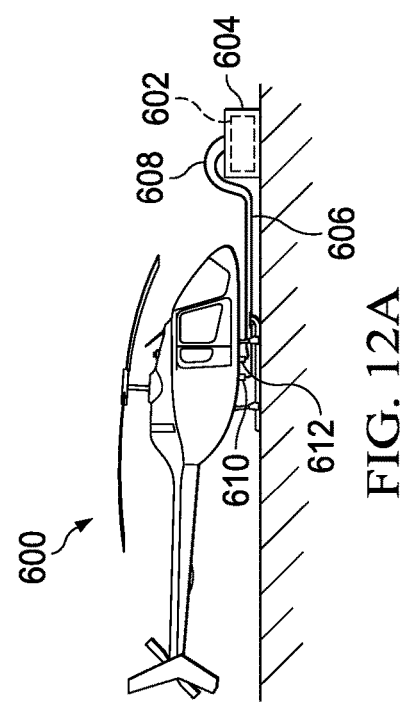

Referring to FIGS. 12A-12F in the drawings, a sequential flight operating scenario of eVTOL aircraft 600 using an ejectable supplemental battery 602 is depicted. As best seen in FIG. 12A, aircraft 600 and ejectable battery containment structure 604 are positioned on the ground prior to takeoff. Ejectable battery containment structure 604 is attached to the underside of the fuselage of aircraft 600 via power cable 606 and weight cable 608. Power cable 606 and weight cable 608 may be detached from aircraft 600 at cable joints 610, 612, respectively. Cable joints 610, 612 may be or include existing cargo attach locations of aircraft 600 such as cargo hooks with detachment capabilities.

Figure 12F:
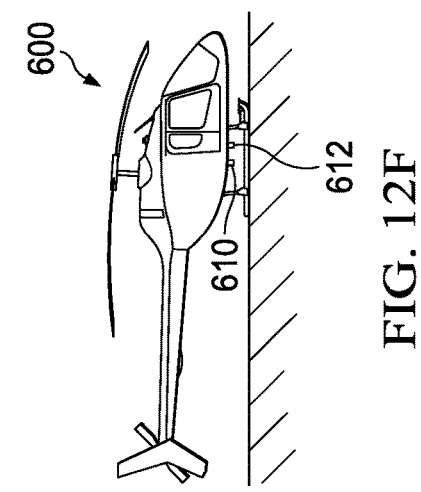
Figure 12E:
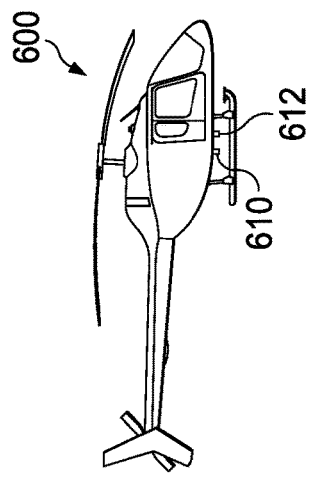
Figure 12D:
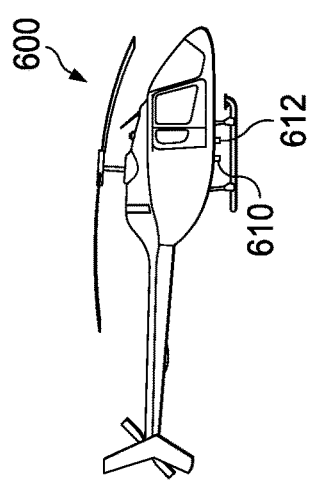
Figure 12D:
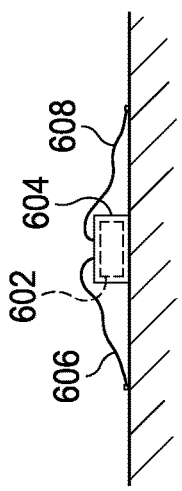

When aircraft 600 is ready for a mission, a flight control system on aircraft 600 commences operations to provide flight control to aircraft 600 which may be onboard pilot flight control, remote flight control, autonomous flight control or a combination thereof. For example, it may be desirable to utilize onboard pilot flight control during certain maneuvers such as takeoff and landing but rely on autonomous flight control during hover and/or forward flight. In FIG. 12B, aircraft 600 has lifted off from the ground and is in hover while supporting ejectable battery containment structure 604 as a sling load. aircraft 600 has gained altitude in FIGS. 12C-12D. Ejectable battery containment structure 604 along with ejectable supplemental battery 602 have been ejected from aircraft 600 by severing the connection thereto at cable joints 610, 612 in response to input from the pilot or ground personnel. As a result, ejectable battery containment structure 604 has fallen to the ground as shown in FIG. 12D. In some embodiments, the descent of ejectable battery containment structure 604 may be controlled or slowed using a parachute or drone coupled to ejectable battery containment structure 604. It will be appreciated that ejectable battery containment structure 604 may be ejected at any altitude and at any time including either immediately before or immediately after takeoff. If ejected at takeoff, aircraft 600 is not required to carry the weight of ejectable battery containment structure 604 and ejectable supplemental battery 602 during flight while benefitting from the supplemental power provided by ejectable supplemental battery 602 at takeoff. Ejectable battery containment structure 604 may be ejected for a variety of reasons including for a safety hazard such as a battery fire or for performance reasons such as reducing flight weight load. In FIG. 12E, aircraft 600 enters the landing phase as it begins to vertically descend onto the ground. In FIG. 12F, aircraft 600 has landed on the ground.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An external power assist system for charging batteries onboard an eVTOL aircraft positioned on a surface, the external power assist system comprising:
   a subsurface power source;
   a subsurface stow cavity; and
   a power transfer interface electrically coupled to the subsurface power source, the power transfer interface telescopically slidable in a substantially vertical direction between a plurality of positions including a deployed position in which the power transfer interface extends above the surface and a stowed position in which the power transfer interface is retracted below the surface into the subsurface stow cavity;
   wherein, the power transfer interface is configured to charge batteries of the eVTOL aircraft in the deployed position.

2. The external power assist system as recited in claim 1 wherein the subsurface power source comprises one or more batteries.

3. The external power assist system as recited in claim 1 wherein the subsurface power source comprises a generator.

4. The external power assist system as recited in claim 1 wherein the subsurface power source comprises a power grid connection configured to electrically couple to a power grid.

5. The external power assist system as recited in claim 4 wherein the subsurface power source comprises a power supply to convert power from the power grid to power usable by the batteries of the eVTOL aircraft.

6. The external power assist system as recited in claim 1 wherein the power transfer interface is configured to mechanically couple to the eVTOL aircraft in the deployed position to form a wired power connection.

7. The external power assist system as recited in claim 1 wherein the power transfer interface is configured to electrically couple to the eVTOL aircraft in the deployed position to form a wireless power connection.

8. The external power assist system as recited in claim 1 wherein the power transfer interface moves between the deployed and stowed positions in response to input from an operator.

9. The external power assist system as recited in claim 1 wherein the power transfer interface moves from the deployed position to the stowed position in response to the batteries of the eVTOL aircraft reaching a charge threshold.

10. The external power assist system as recited in claim 1 wherein the power transfer interface moves from the deployed position to the stowed position in response to electrical decoupling between the power transfer interface and the eVTOL aircraft.

11. An aircraft system comprising:
- an eVTOL aircraft positioned on a surface, the eVTOL aircraft including one or more onboard batteries; and
- an external power assist system configured to selectively charge the onboard batteries of the eVTOL aircraft, the external power assist system comprising:
- a subsurface power source;
- a subsurface stow cavity; and
- a power transfer interface electrically coupled to the subsurface power source, the power transfer interface telescopically slidable in a substantially vertical direction between a plurality of positions including a deployed position in which the power transfer interface extends above the surface and a stowed position in which the power transfer interface is retracted below the surface into the subsurface stow cavity;
- wherein, the power transfer interface is configured to charge the onboard batteries of the eVTOL aircraft in the deployed position.

12. The aircraft system as recited in claim 11 wherein the eVTOL aircraft has a vertical takeoff and landing flight mode including a takeoff phase, the power transfer interface configured to transfer power to the eVTOL aircraft during the takeoff phase, thereby conserving power of the onboard batteries.

13. The aircraft system as recited in claim 11 wherein the eVTOL aircraft comprises a power transfer port configured to couple to the power transfer interface in the deployed position.

14. The aircraft system as recited in claim 13 wherein the eVTOL aircraft comprises a fuselage and the power transfer port is disposed on an underside of the fuselage.

15. The aircraft system as recited in claim 13 wherein the eVTOL aircraft has a vertical takeoff and landing flight mode including a landing phase; and
- wherein, the power transfer interface is movable along the surface in the deployed position to align with the power transfer port of the eVTOL aircraft in the landing phase of the eVTOL aircraft.

16. The aircraft system as recited in claim 11 wherein the power transfer interface comprises a wireless power transmitter and the eVTOL aircraft comprises a wireless power receiver, the wireless power transmitter of the power transfer interface configured to transfer power to the wireless power receiver of the eVTOL aircraft in the deployed position.

* * * * *